(12) United States Patent
Burch

(10) Patent No.: US 6,374,586 B1
(45) Date of Patent: Apr. 23, 2002

(54) METHOD FOR CUTTING AND TREATING VEGETATION

(76) Inventor: Thomas B. Burch, P.O. Box 1046, North Wilkesboro, NC (US) 28607

( * ) Notice: Subject to any disclaimer, the term of this patent is extended or adjusted under 35 U.S.C. 154(b) by 109 days.

(21) Appl. No.: 09/587,141

(22) Filed: Jun. 2, 2000

Related U.S. Application Data

(62) Division of application No. 09/011,589, filed as application No. PCT/US96/13362 on Aug. 16, 1996, now Pat. No. 6,125,621.
(60) Provisional application No. 60/002,397, filed on Aug. 17, 1995, and provisional application No. 60/007,633, filed on Nov. 28, 1995.

(51) Int. Cl.7 ............................................... A01C 15/00
(52) U.S. Cl. ...................................................... 56/16.8
(58) Field of Search ............................... 56/16.4–16.8, 56/255, 295, 121, 15.2, 233, 320.1, 320.2, DIG. 20; 239/165, 169, 172, 175

(56) References Cited

U.S. PATENT DOCUMENTS

| | | | | | |
|---|---|---|---|---|---|
| 2,878,633 A | * | 3/1959 | Mullin | ........................ | 56/16.8 |
| 2,908,444 A | * | 10/1959 | Mullin | ........................ | 56/16.8 |
| 3,090,187 A | * | 5/1963 | Livingston | ................... | 56/16.8 |
| 3,332,221 A | * | 7/1967 | McCain | ....................... | 56/16.8 |
| 3,942,308 A | * | 3/1976 | Vicendese | .................... | 56/16.8 |
| 4,870,946 A | * | 10/1989 | Long et al. | ............. | 30/123.3 X |
| 4,926,622 A | * | 5/1990 | McKee | ........................ | 56/16.8 |
| 5,329,752 A | * | 7/1994 | Milbourn | ..................... | 56/16.4 |

* cited by examiner

Primary Examiner—Robert E. Pezzuto
(74) Attorney, Agent, or Firm—Dougherty & Clements LLP

(57) ABSTRACT

A method for cutting vegetation and simultaneously treating the remaining stems of the cut vegetation with a treatment fluid. In a mower having a cutting blade assembly rotatably mounted on a blade carrier, a treatment fluid in a removable fluid container cells is pumped to the cutting blade. The method includes the steps of cutting vegetation with at least one cutting blade, and delivering a treatment fluid to the underside of the at least one cutting blade in a continuous stream so that the treatment fluid is continuously available to the remaining stems of the cut vegetation. Metering the amount of treatment fluid that is pumped to the cutting blade assembly is precisely controlled at a very low, but effective, rate.

14 Claims, 21 Drawing Sheets

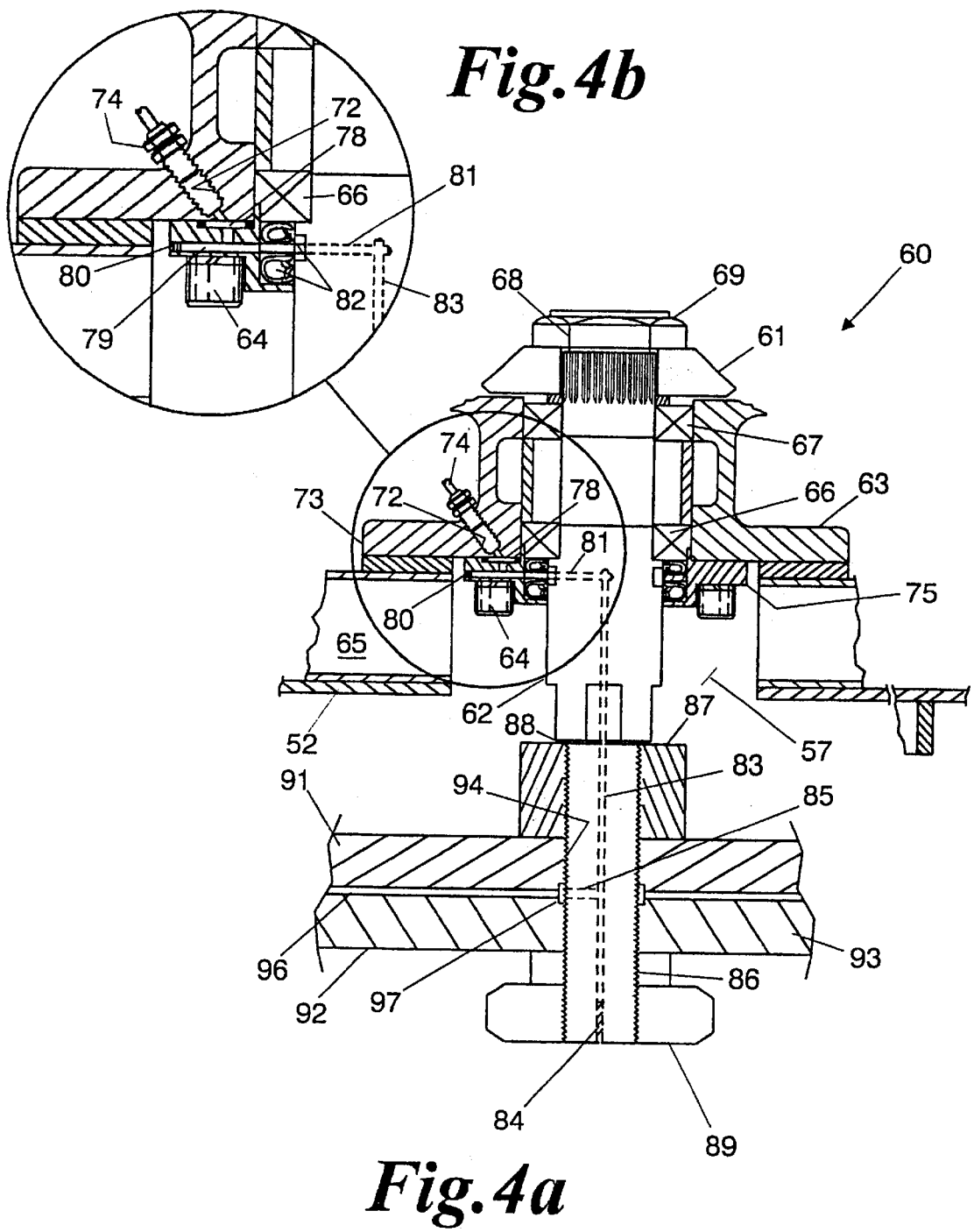

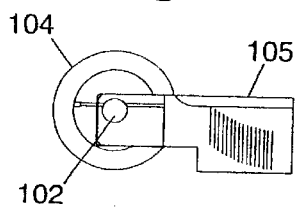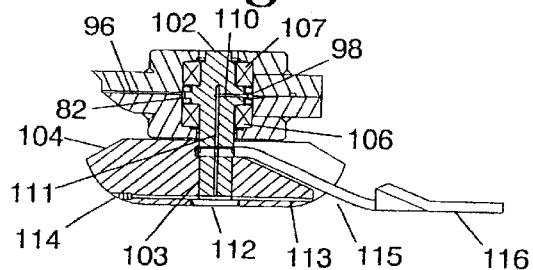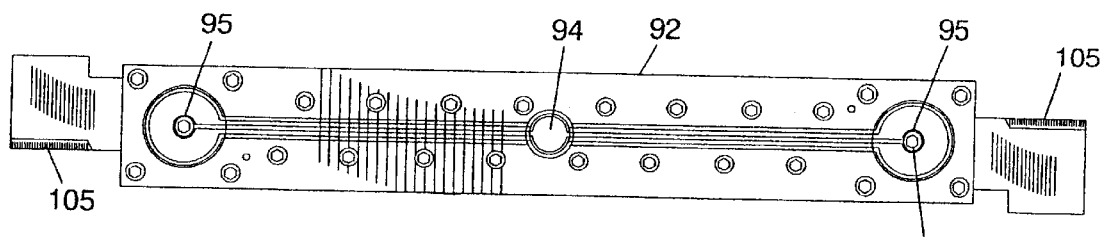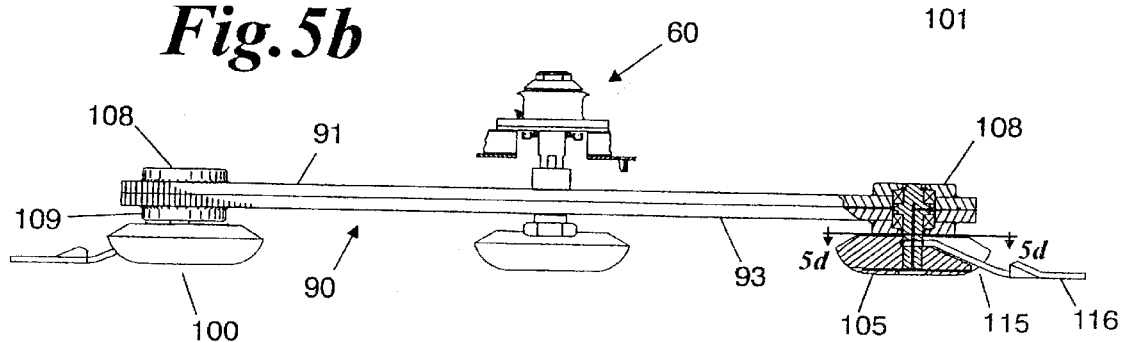

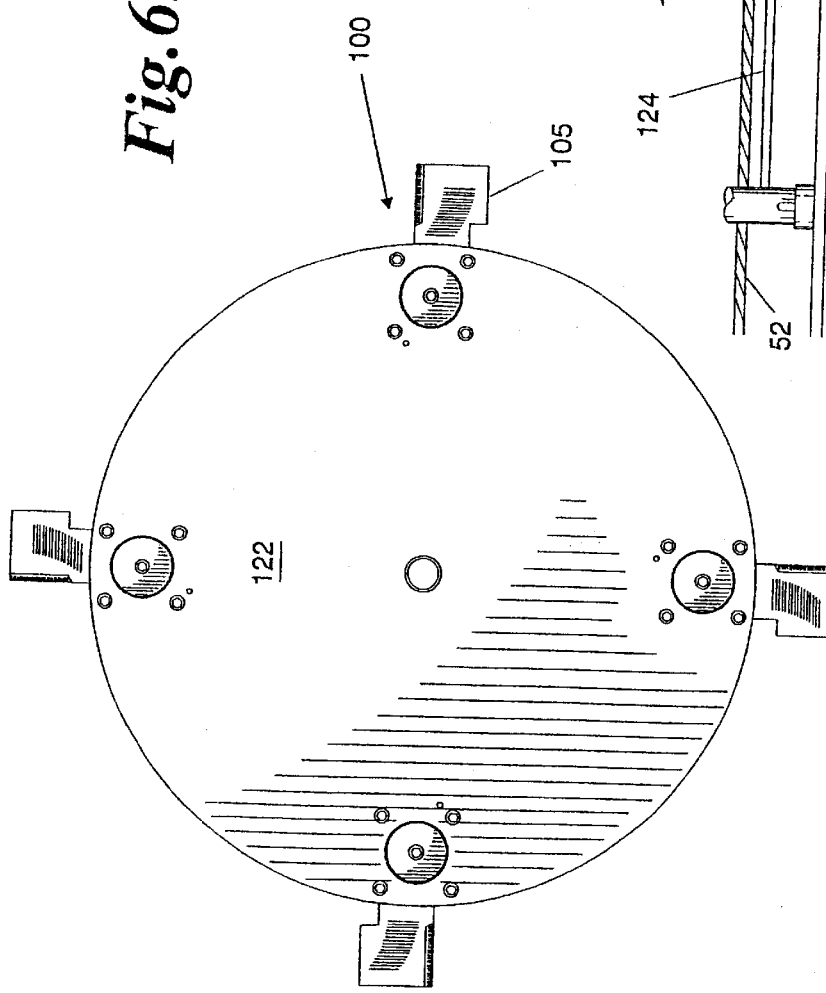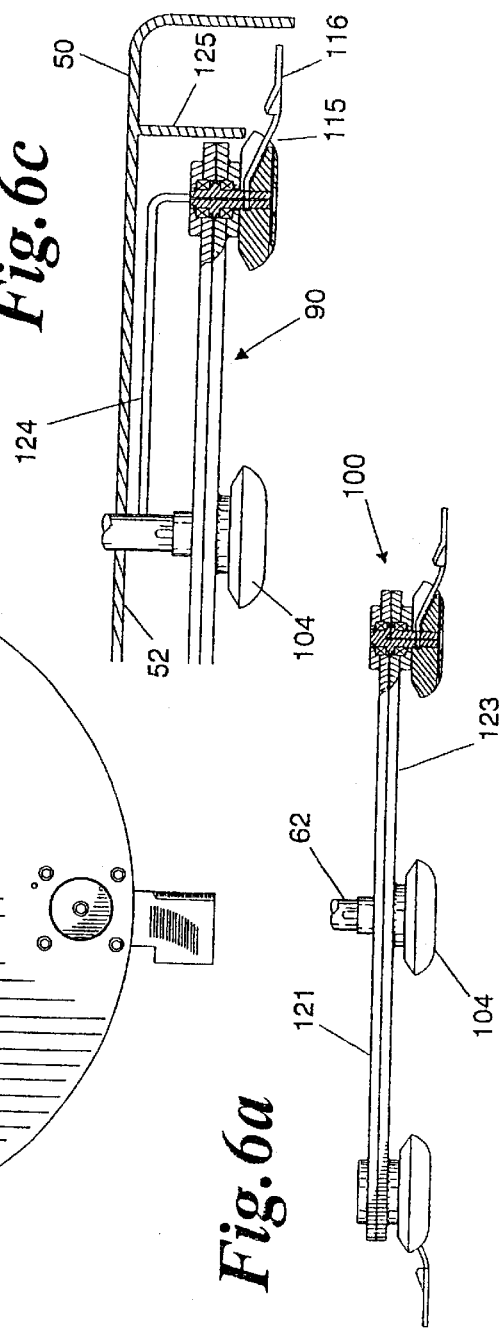

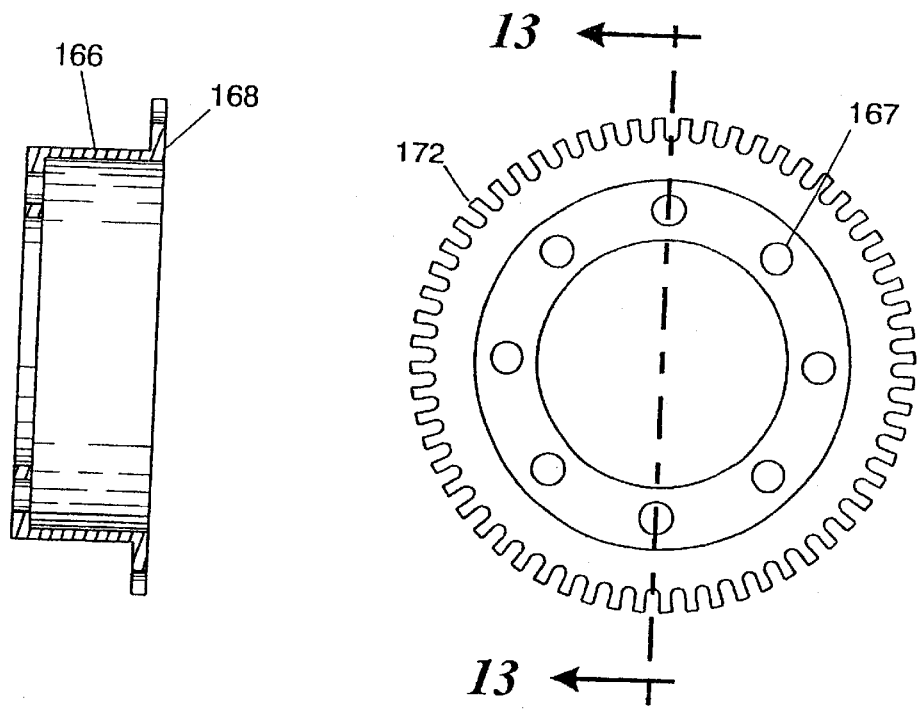
Fig.13  Fig.12
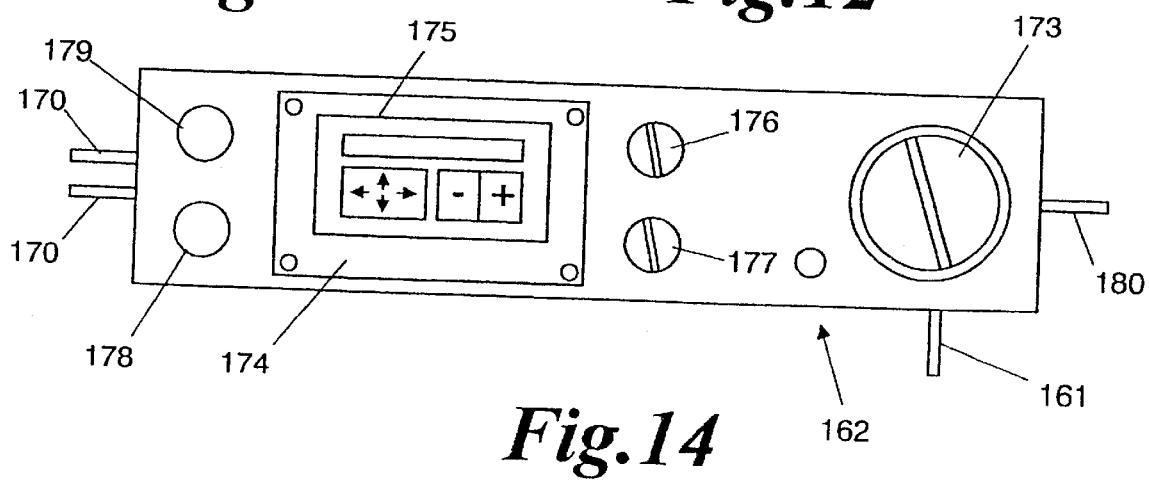
Fig.14

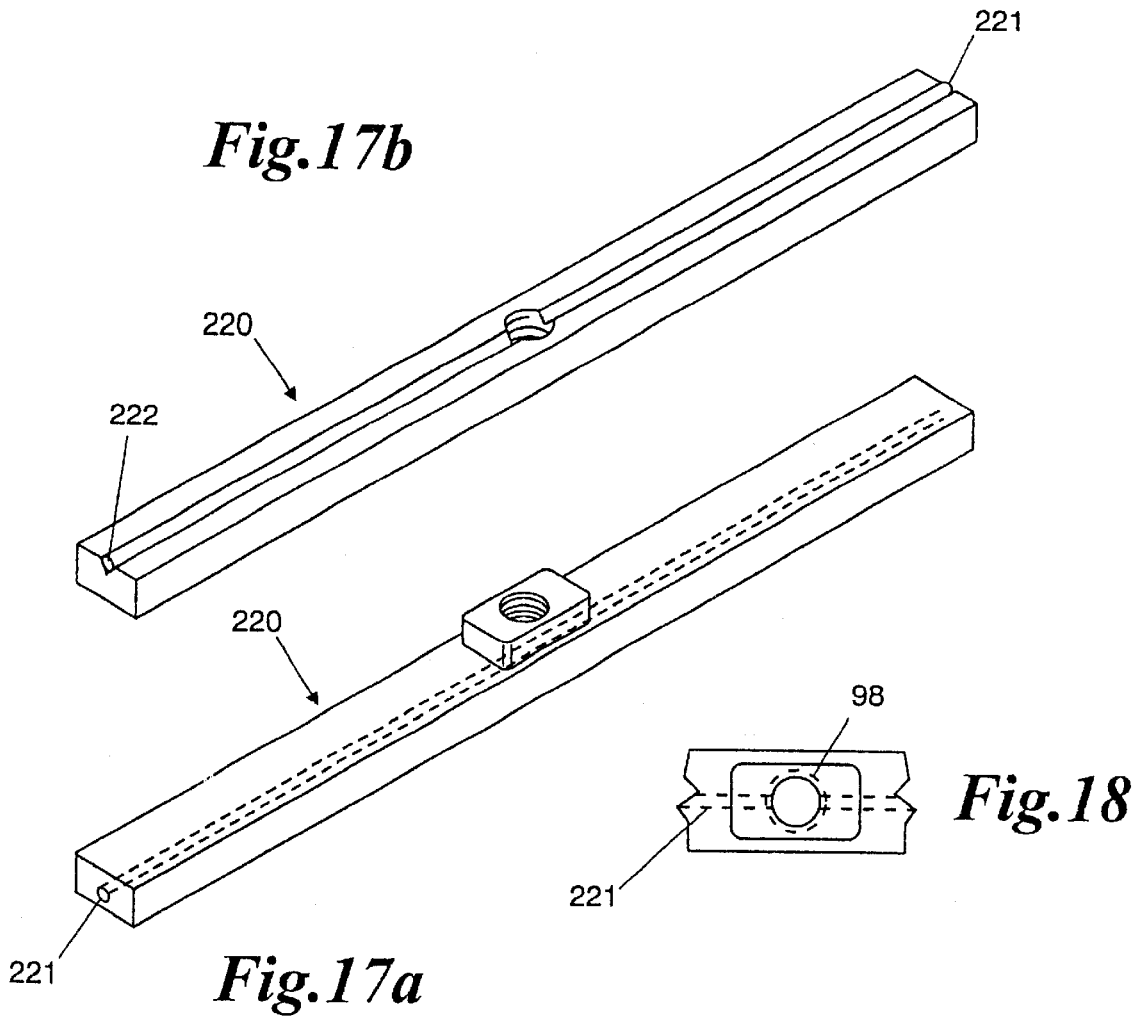

METHOD FOR CUTTING AND TREATING VEGETATION

CROSS REFERENCE TO RELATED APPLICATIONS

Priority is claimed from U.S. patent application Ser. No. 09/011,589 filed Feb. 9, 1998, now U.S. Pat. No. 6,125,621, Provisional Application 60/002,397 filed Aug. 17, 1995, Provisional Application 60/007,633 filed Nov. 28, 1995, and PCT/US96/13362 filed Aug. 16, 1996.

FIELD OF THE INVENTION

The present invention relates to an apparatus and method for cutting and treating vegetation, and more particularly to an apparatus and method for cutting vegetation while simultaneously applying a treatment fluid to the remaining stems of the cut vegetation.

BACKGROUND OF THE INVENTION

Power companies periodically cut the vegetation that grows along powerline right-of-ways to maintain access to the powerlines and to minimize line losses. Access is required to facilitate service and repair of damaged powerlines. Excessive line losses may occur when high, dense vegetation beneath the powerline causes the electricity flowing through the powerline to bleed into the ground. The higher and more dense the vegetation, the greater the spurious radiation loss from the powerline. Similarly, highway departments periodically cut the vegetation that grows in medians and along roadsides to enhance the safety of motorists and pedestrians. Cutting the vegetation improves visibility and provides a shoulder along the road for emergency stops. As the demand for electrical power and highways increases, the number of right-of-way and roadside miles multiplies exponentially. Accordingly, power companies and highway departments continually seek more efficient and cost effective methods for cutting vegetation along right-of-ways and roadsides.

Power companies and highway departments have discovered that it is advantageous to treat the vegetation at the time it is cut with a treatment to control the growth of unwanted vegetation, or to reduce the rate of growth of desirable vegetation. The vegetation is typically treated with a granular or fluid treatment such as a growth regulator, herbicide, pesticide, fungicide, fertilizer or biological agent, depending on the desired result. The application of a treatment fluid to vegetation is most often accomplished by broadcasting the fluid through the air so that the treatment comes in contact with the vegetation, and is held in place by adhesion of the fluid to the individual plants. The most common methods of broadcasting treatment fluids include spraying the treatment in the area containing the vegetation from an aerial vehicle, from a ground vehicle fitted with a series of spray nozzles, from a hand-held sprayer or from a mower equipped with a treatment applicator. As yet, however, there has not been a mower equipped with a treatment applicator which is capable of cutting vegetation and treating the cut vegetation in a non-horizontal orientation, such as on a hillside using a mower head attached to the end of a hinged boom arm.

Unfortunately, these broadcasting methods do not permit accuracy or control in applying the treatment fluid to the plants. Broadcasting methods, and spraying in particular, allow the treatment to come into contact with desirable plants, and to be applied in areas other than the area to be treated. Once the treatment is broadcast into the air, the spray pattern becomes random and some plants may not be treated at all. Further, when the concentration of the treatment is high, the operator usually applies more treatment than is necessary, and thus substantial amounts of the treatment are wasted. Treatment fluids are typically applied until the foliage of the plant is visibly wet. Thus, there is no way of predicting how much of the treatment will fall onto the ground around the plant where it may contaminate the surrounding soil and the underground water system, and how much, if any, of the treatment will be absorbed into the vascular system, or translocation stream, of the plant where it will produce the desired result.

DowElanco, a manufacturer of herbicides, instructs users that its fluid chemistry is effective only if the treatment penetrates the foliage and is absorbed into the translocation stream of the plant. As a result, chemical companies produce chemicals known as "adjuvants" that enable treatment fluids that are broadcast by spraying to penetrate through dense foliage. Many treatment fluids also include a surfactant to promote absorption of the agent into the translocation stream of the plant. Nevertheless, usually only a small percentage of the volume of treatment fluid that is broadcast by spraying actually reaches the translocation stream of the plant. The remainder of the treatment fluid falls onto the ground where it may mix with precipitation and run onto surrounding land, or may vaporize into the atmosphere and be blown by the wind onto surrounding land.

Naturally, farmers and people living in close proximity to powerline right-of-ways and highways object to the application of treatment fluids which results in run-off or wind drift. Consequently, power companies and highway departments are often restricted by governmental regulations and local ordinances from broadcasting treatment fluids by spraying. Even though the power companies and highway departments regularly heed these regulations and ordinances, environmentalists complain that anytime a treatment fluid is applied by a broadcasting method there is necessarily some contamination of the ground and underground water system, as well as some risk of run-off and wind-drift. Further, in the event that a chemical contamination of the ground or water in the vicinity of the treatment area occurs, the power companies and the highway departments cannot conclusively prove that the cutting and treating operation was not the source of the contamination.

DESCRIPTION OF THE PRIOR ART

Various apparatus exist for cutting and treating vegetation with a treatment fluid. For example, U.S. Pat. Nos. 2,908,444 and 2,939,636 issued Oct. 13, 1959, and Jun. 7, 1960, respectively to Mullin; U.S. Pat. No. 2,973,615 issued Mar. 7, 1961, to Yaremchuk; and U.S. Pat. No. 3,332,221 issued Jul. 25, 1967, to McCain each disclose a rotary lawnmower equipped with a fluid chemical sprayer. U.S. Pat. No. 5,237,803 issued Aug. 24, 1993, to Domingue, Jr. discloses a "bushhog" or "batwing" cutting apparatus equipped with a fluid chemical sprayer. The sprayers are located above the blade and within the housing of the mower so that the spray of treatment fluid is confined to the area immediately beneath the housing as the mower moves over the ground. The treatment fluid is dispersed by the centrifugal force generated by the rotating blade, or is released above the blade of the mower, so that a portion of the fluid vaporizes as it impinges the housing and/or the rotating blade of the mower. Nevertheless, the treatment fluid may fall onto the ground around the plant, and the vaporized treatment may be carried by the wind onto surrounding land. In addition, none of these apparatus are capable of cutting vegetation and treating the cut vegetation in a non-horizontal orientation, such as from the end of a hinged boom arm.

U.S. Pat. No. 2,878,633 issued Mar. 24, 1959, to Mullin and U.S. Pat. No. 3,090,187 issued May 21, 1963, to Livingston each disclose a rotary lawnmower equipped with means for distributing a treatment fluid to the rotating blade of the mower. The Mullin patent further discloses conduit means for delivering the treatment fluid to an axial bore formed in the rotating shaft of the mower which terminates at an orifice formed in the underside of the blade. The centrifugal force of the rotating blade, however, throws the treatment fluid out from the orifice in droplet form. The Livingston patent further discloses a longitudinal groove formed in the leading edge of the blade for delivering the treatment fluid to the underside of the tip of the blade. Accordingly, the treatment fluid is applied directly to the freshly cut stem of the plant. The distributing means of the Livingston mower, however, is open to the atmosphere. Thus, the treatment fluid may be spilled onto the surrounding ground, or vaporized and carried by the wind onto the surrounding land.

U.S. Pat. No. 4,926,622 issued May 22, 1990, to McKee discloses a rotary brush cutter and herbicide applicator. The cutter includes a plurality of cutting blades and the applicator includes means for delivering the herbicide adjacent the cutting blades so that the herbicide is applied to the brush as it is being cut by the rotating cutting blades. In one embodiment, the applicator further includes a closed conduit for transporting the treatment fluid from a container mounted on the housing of the rotary cutter to an outlet port adjacent the cutter blade. The conduit includes an elongate tube fixed to the external surface of the rotating blade so that the outlet port is in fluid communication with the axial shaft of the rotary cutter. The tube, however, may break or kink as the blade bends longitudinally, and is subject to being punctured or torn away if the blade strikes a relatively immovable rock or stump.

As is apparent from the limitations of the above rotary mowers, an apparatus and method is needed for cutting vegetation and treating the cut vegetation with a treatment fluid which does not broadcast the treatment fluid onto the surrounding ground or into the atmosphere. Accordingly, it is an object of the invention to provide an apparatus and method for cutting vegetation and simultaneously applying a treatment fluid to the remaining stems of the cut vegetation without broadcasting the treatment fluid onto the surrounding ground or into the atmosphere.

It is another and more particular object of the invention to provide an apparatus and method for cutting and simultaneously treating the remaining stems of the cut vegetation which includes means for delivering a treatment fluid to the underside of a cutting blade so that a stream of treatment fluid is continuously available to the remaining stems of the vegetation.

It is another object of the invention is to provide an apparatus and method for cutting and simultaneously treating the remaining stems of the cut vegetation by introducing a treatment fluid to the translocation stream of the vegetation.

It is another object of the invention to provide an apparatus and method for cutting vegetation and simultaneously applying a treatment fluid to the remaining stems of the cut vegetation which is capable of being used in any orientation, and in particular in any inclination from horizontal including vertical.

It is another object of the invention to provide an apparatus and method for cutting and simultaneously treating vegetation which includes a removable, hermetically sealed fluid container means for containing the treatment fluid.

It is another and more particular object of the invention to provide a method and apparatus for cutting and treating vegetation with a treatment fluid which minimizes spillage, waste and spoilage of the treatment fluid.

It is another object of the invention to provide an apparatus and method for cutting vegetation and simultaneously applying an accurate amount of a treatment fluid to the remaining stems of the cut vegetation.

It is another and more particular object of the invention to provide an apparatus and method for cutting and simultaneously treating vegetation which includes a flow control means for accurately metering the amount of treatment fluid that is delivered to the cutting blade.

It is another and more particular object of the invention to provide an apparatus and method for cutting and simultaneously treating vegetation which includes a ground speed detection means for detecting the ground speed of the mower so that the desired amount of treatment fluid is applied to the remaining stems of the cut vegetation.

It is another object of the invention to provide an apparatus and method for recording the location and the volume of a treatment fluid that is applied to powerline right-of-ways and highway medians and roadsides.

SUMMARY THE INVENTION

The invention is an apparatus and method for cutting vegetation and simultaneously treating the remaining stems of the cut vegetation with a treatment fluid such as a growth regulator, herbicide, pesticide, fungicide, fertilizer, adjuvant, surfactant or biological agent, which is preferably waterborn. The treatment fluid is applied without broadcasting, such as by spraying, the treatment onto the surrounding ground or into the atmosphere. Instead, the treatment fluid is delivered from a hermetically sealed fluid container through a fluid conduit to the underside of the cutting blade in a continuous fluid stream.

Accordingly, the treatment fluid is continuously available to the cut ends of the remaining stems at the time that the vegetation is cut so that at least about 75–95% of the treatment fluid is absorbed directly into the translocation stream of the plant in near zero time, thereby maximizing the efficacy of the treatment and vastly reducing the required amount of treatment fluid as well as amount of active ingredient.

The apparatus includes a mower, a cutting blade drive means for rotating a cutting and treating means including at least one cutting blade assembly rotatably mounted on a blade carrier, a fluid container means for containing the treatment fluid, a flow control means for metering the amount of treatment fluid delivered to the cutting and treating means, and fluid conduit means for delivering the treatment fluid from the fluid container means to the cutting and treating means.

The mower may be any maneuverable tool for cutting vegetation which is movable over the ground, or above the ground such as for trimming hedges, trees and orchards. For example, the mower may be a push lawnmower, a conventional power lawnmower, a riding lawnmower, an engine driven tractor, a bushog mower, a batwing mower, a harvester, a hydraulic feller buncher, a high speed saw head, a high speed shear head, a sickle bar, a multiple disk mower, a reel mower, a flail mower or a mower head attached to the end of a hinged boom arm. For purposes of illustration only, the mower described herein is a conventional bushhog mower which is attached to the rear of an agricultural tractor.

The mower preferably includes a generally planar mower deck having a central opening therethrough for receiving the cutting blade drive means therein, a pair of generally linear, opposed sides, a generally linear front wall and an arcuate rear wall. At least a portion of the rear wall may include a plurality of short lengths of debris chain for preventing debris, such as loose stones, from being expelled from the underside of the mower deck. The mower is provided with at least one wheel secured to the mower deck for facilitating movement over the ground and for supporting the cutting and treating means at the desired height above the ground. A plurality of upright stanchions are fixed to the top surface of the mower deck for retaining the fluid container means therebetween.

The cutting blade drive means is secured to the mower deck and includes an elongate drive shaft received within the central opening of the mower deck. The cutting blade drive means is preferably powered by the power takeoff from the tractor which pulls the mower. However, the cutting blade drive means may be powered by a gasoline engine, or a hydraulic motor mounted to the topside of the mower deck. In a preferred embodiment, a bevel gear is provided adjacent one end of the drive shaft for engaging the rotating shaft of the power take-off of the tractor. The cutting and treating means is secured to the other end of the drive shaft. Regardless, the cutting blade drive means rotates the drive shaft of the cutting blade drive means which in turn rotates the blade carrier and at least one cutting blade assembly of the cutting and treating means. The drive shaft of the cutting blade drive means has a fluid conduit formed therein defining a continuous fluid passageway so that the drive shaft of the cutting blade drive means is in fluid communication with the pumping means and the cutting and treating means.

The cutting and treating means is secured to the drive shaft of the cutting blade drive means adjacent the underside of the mower deck, and includes at least one cutting blade assembly rotatably mounted on a blade carrier. The blade carrier may be any shape for mounting the at least one cutting blade assembly thereon. In a preferred embodiment, the blade carrier is an elongate bar having a central opening for receiving the cutting blade drive means therein, and at least one opening adjacent an end of the bar for receiving a cutting blade assembly therein. A lengthwise fluid conduit is provided between the central opening and the opening adjacent the end of the bar. The fluid conduit defines a continuous fluid passageway so that the drive shaft of the cutting blade drive means is in fluid communication with the cutting blade assembly. In another preferred embodiment, the blade carrier is a generally planar disk having a plurality, and preferably four orthogonally spaced, cutting blade assemblies mounted thereon.

At least one cutting blade assembly is rotatably mounted adjacent an end of the blade carrier. Preferably, a cutting blade assembly is mounted adjacent each of the opposed ends of the blade carrier. The cutting blade assembly includes a cutting blade shaft and a cutting blade hub secured on the cutting blade shaft. The cutting blade hub includes a cutting blade disposed outwardly therefrom. Preferably, the underside of the hub is saucer-shaped so that if the hub strikes an obstacle on the ground in the path of the cutting blade, the hub will travel over the obstacle without transferring a shock to the cutting blade. The leading edge of the cutting blade is beveled to provide a sharp cutting edge. The cutting blade assembly has a fluid conduit formed therein defining a continuous fluid passageway so that the fluid conduit provided in the blade carrier is in fluid communication with the underside of the cutting blade.

The fluid container means is secured between the upright stanchions provided on the topside of the mower deck. The fluid container means includes at least one substantially hollow, hermetically sealed fluid container cell containing the fluid treatment. In a preferred embodiment, the fluid container means includes a plurality of stacked, interlocking, removable, interconnected fluid container cells. Each of the cells is made of a material which is substantially resistant to ultraviolet light, such as polyurethane, polyethylene or polyvinylchloride (PVC) plastic.

An inlet port and an outlet port is provided on each cell and fitted with the female portion of a double end shutoff fitting. The male portion of the fitting engages the female portion of the fitting to permit treatment fluid to flow from an upper cell to a lower cell, and from the lowermost cell to a bulkhead fitting adjacent the pumping means. A flexible fluid conduit connects the outlet port of each upper cell to the inlet port of the next lowest cell. The flexible fluid conduit from the outlet port of the bottommost cell passes through the pumping means and is connected to a fitting provided on the housing of the cutting blade drive means. Accordingly, the fluid container means is in fluid communication with the cutting blade drive means. The male portion of the fitting which engages the female portion of the fitting in the inlet port of the uppermost cell is connected to an in-line filter and breather cap for venting the fluid container cells to the ambient atmosphere. The filter prevents debris, insects, etc. from entering the system without restricting the entry of ambient air.

The cells are stacked so that the bottommost cell is automatically filled with the treatment fluid from the upper cells as the treatment fluid is applied to the vegetation. Any number of cells may be filled at a remote location so that the treatment fluid is not spilled at the worksite where it may contact workers, contaminate the surrounding soil or the underground water supply. The cells are hermetically sealed so that the treatment fluid will not spoil or lose potency. A predetermined number of pre-filled cells may be stacked so that the user need not interrupt the cutting and treating operation to refill cells or to replace empty cells. The emptied cells are returned to a formulator for refilling without the need for rinsing at the treatment site and are never disposed of in public land fills or dumpsters.

The flow control means meters the amount of the treatment fluid which is delivered by the pumping means to the underside of the cutting blade. The flow control means includes a control unit which is electrically coupled to a ground speed detection means. The ground speed detection means includes a sensor for detecting the angular velocity of the rear wheel of the tractor, and thus the estimated ground speed of the mower. In a preferred embodiment, a ground speed detection means is provided adjacent each of the rear wheels of the tractor and the angular velocity of the rear wheels is averaged and multiplied by a correction factor to more accurately estimate the ground speed of the tractor. The control unit is also electrically coupled to a DC stepper drive motor which drives the pumping means so that the desired amount of treatment fluid is applied to the vegetation in the area being treated.

The fluid conduit means defines a continuous fluid passageway so that the fluid container means is in fluid communication with the cutting blade assembly of the cutting and treating means. The fluid conduit means includes the flexible conduit extending between the outlet port of the bottommost fluid container cell and the fluid fitting provided on the housing of the cutting blade drive means, the continuous fluid passageway defined by the fluid conduit of the cutting blade drive means, the continuous fluid passageway defined by the blade carrier, and the continuous fluid passageway defined by the cutting blade assembly. Accordingly, the fluid conduit means forms a continuous fluid passageway for delivering the treatment fluid to the underside of the cutting blade so that a stream of treatment fluid is continuously available to the remaining stems of the vegetation at the time that the vegetation is cut.

BRIEF DESCRIPTION OF THE DRAWINGS

While some of the objects and advantages of the invention have been stated, others will become apparent as preferred embodiments of the invention are described in connection with the accompanying drawings in which:

FIG. 4a is a sectional view of the cutting blade drive means of the bushog mower of FIG. 1b;

FIG. 4b is an enlarged view of the cutting blade drive means of FIG. 4a;

FIG. 5a is an elevation view and partial sectional view of the cutting and treating means of the bushog mower of FIG. 1b;

FIG. 5b is a top view of the cutting and treating means of the bushog mower of FIG. 1b;

FIG. 5c is an enlarged view of the partial sectional view of FIG. 5a;

FIG. 5d is top view of the cutting blade hub taken along line 5d—5d of FIG. 5a;

FIG. 6a is an elevation view and partial sectional view of an alternative embodiment of the cutting and treating means of the bushog mower of FIG. 1b;

FIG. 6b is a top view of an alternative embodiment of the cutting and treating means of the bushog mower of FIG. 1b;

FIG. 6c is an elevation view and partial sectional view of an alternative embodiment of the cutting and treating means of the bushog mower of FIG. 1b;

FIG. 10a is a sectional view of the FLO-THRU CELL™ of FIG. 10 taken along line 10a—10a;

FIG. 12 is an end view of the flange carrier of the flow control means of FIG. 11;

FIG. 13 is a sectional view of the flange carrier of the flow control means of FIG. 12 taken along line 13—13;

FIG. 14 is a front view of the controller of the flow control means of FIG. 12;

FIG. 16 is a schematic diagram illustrating the preferred components of the power lawnmower of FIG. 13a;

FIG. 17a is a perspective view of the blade carrier of FIG. 16;

FIG. 17b is a perspective view of an alternative embodiment of the blade carrier of FIG. 16;

FIG. 18 is a top view of the center portion of the blade carrier of FIG. 17a;

DETAIL DESCRIPTION OF THE PREFERRED EMBODIMENTS

Figure 1A:
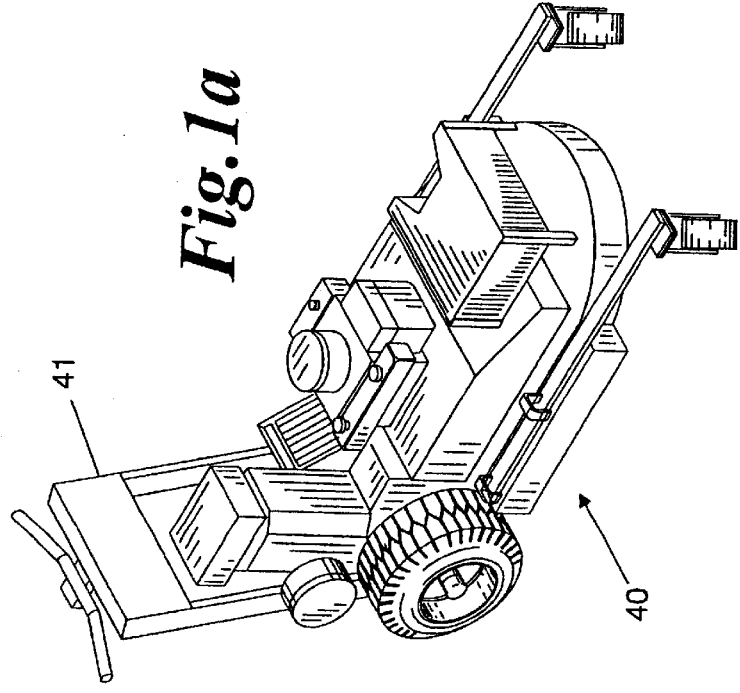
FIG. 1a illustrates a preferred embodiment of a power lawnmower according to the invention.
Figure 1B:
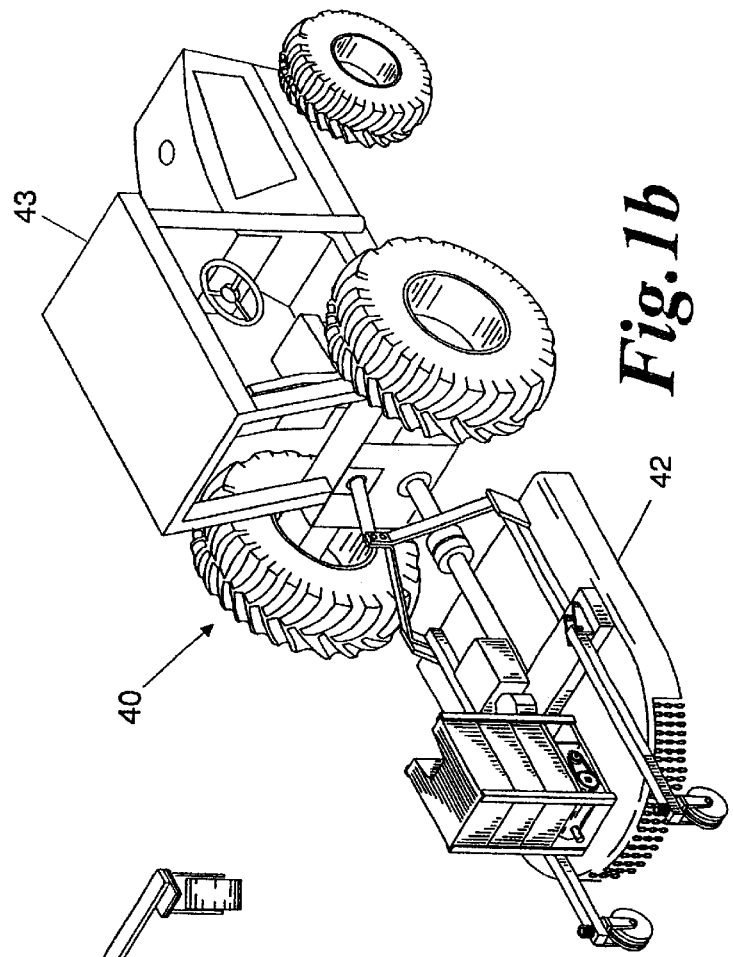
FIG. 1b illustrates a preferred embodiment of a bushog mower according to the invention.
Figure 2:
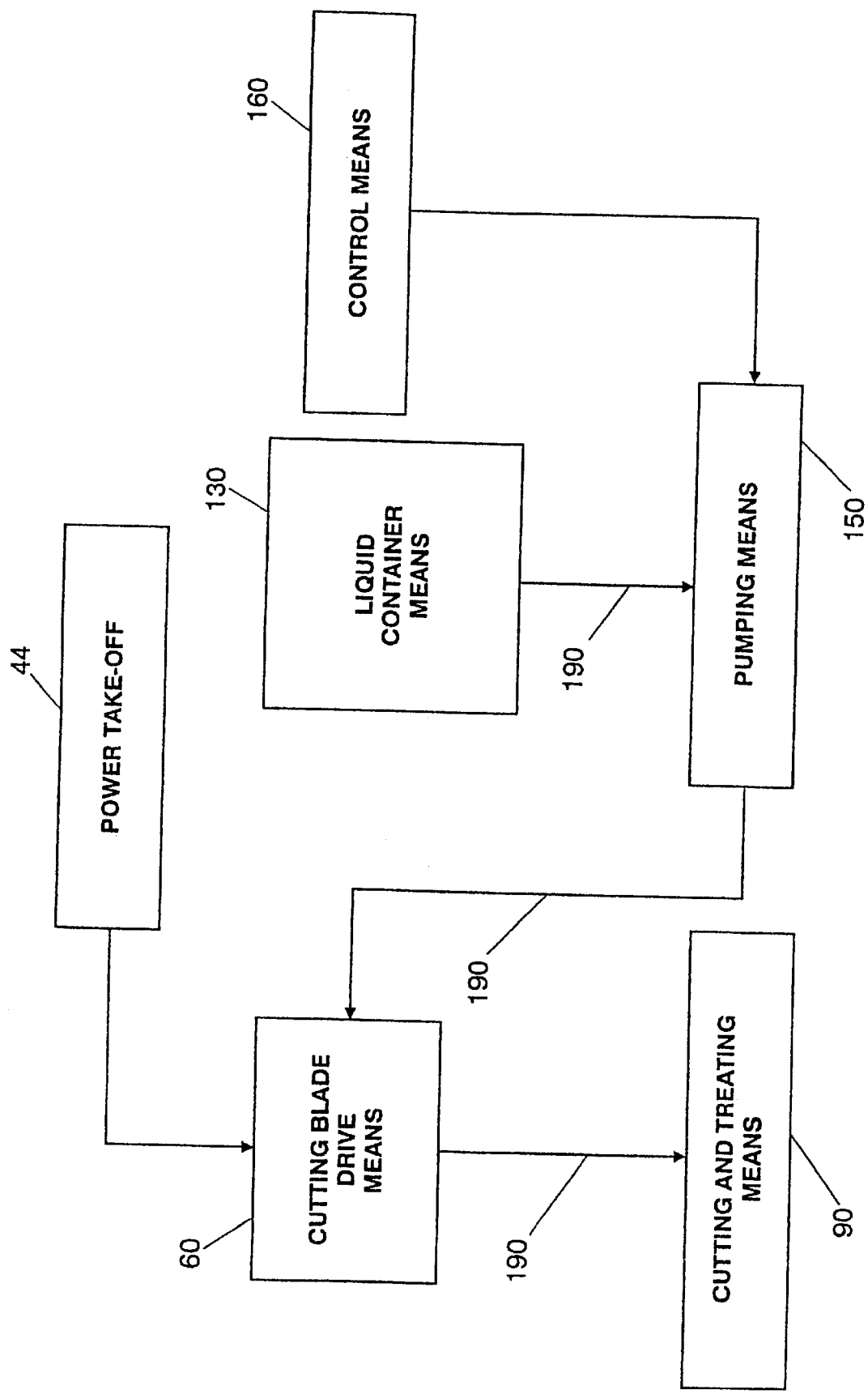
FIG. 2 is a schematic flow diagram illustrating the preferred components of an apparatus for cutting and treating vegetation according to the invention.

Referring to the accompanying drawings in which preferred embodiments of the invention are shown, FIGS. 1a and 1b illustrate apparatus, indicated generally at 40, for cutting vegetation and simultaneously treating the remaining stems of the cut vegetation with a treatment fluid. The treatment fluid may be any treatment fluid which is applied to vegetation such as a growth regulator, herbicide, pesticide, fungicide, fertilizer or biological agent, depending on the desired result. Preferably, the treatment fluid is water-born. However, the treatment fluid may be born by any substance which combines with the treatment fluid to produce a non-viscous, flowable fluid. The apparatus 40 delivers the treatment fluid to the underside of the cutting blade so that a stream of treatment fluid is continuously available to the remaining stems of the cut vegetation at the time that the vegetation is cut. It has been discovered that a physical phenomenon occurs at the time that vegetation is cut. Fluid in the vicinity of the cut end of the remaining stem of the plant is drawn into the translocation stream in zero time, and migrates through the translocation stream to the root system of the plant. This phenomenon has been termed, and is referred to herein as, the "Burch effect".

The Burch effect has led to the development of an apparatus and method, referred to herein as the "BURCH WET BLADES™ system", which takes advantage of the Burch effect to minimize the amount of treatment fluid required to treat the vegetation, and to maximize the efficacy of the treatment. Specifically, the BURCH WET BLADE™ system does not broadcast the treatment fluid, such as by spraying or by treating and spreading treated cuttings, onto the surrounding ground or into the atmosphere. At least about 75–95% of the treatment fluid which is continuously available at the time that the vegetation is cut is absorbed into the translocation stream of the remaining stems of the cut vegetation. Accordingly, practically none of the treatment fluid is wasted, is inadvertently applied to desirable vegetation, or contaminates the surrounding soil and the underground water system.

The BURCH WET BLADE™ system may be configured for use with any apparatus 40 having at least one cutting blade and a means f or delivering a continuous stream of treatment fluid to the underside of the cutting blade. For example, the apparatus 40 may be a push lawnmower, a conventional power lawnmower, a riding lawnmower, an engine driven tractor, a bushog mower, a batwing mower, a harvester, a hydraulic feller buncher, a high speed saw head, a high speed shear head, a sickle bar, a multiple disk mower, a reel mower, a flail mower or a mower head attached to the end of a hinged boom arm, as long as the mower is equipped with suitable means for delivering the continuous stream of treatment fluid to the cut vegetation. In addition to cutting and treating vegetation along right-of-ways and highway medians and roadsides, there are numerous other applications in vegetation management, such as agricultural, turf, ornamental, forestry, and aquatics, wherein the utilization of a non-broadcasting apparatus and method for cutting and treating vegetation is useful, beneficial and practical, including the application of biological agents to the internal translocation streams of plants due to the reduced risk of exposure and the increased efficacy.

For purposes of illustration only, FIG. 1*a* is a perspective view of a power lawnmower 41 equipped with the BURCH WET BLADE™ system. FIG. 1*b* is a perspective view of a bushog mower 42 equipped with the BURCH WET BLADE™ system and attached to the rear of a tractor 43. The bushog mower 42 is utilized herein only to illustrate preferred embodiments of the BURCH WET BLADE™ system. As previously stated, the BURCH WET BLADE™ system may be utilized with any apparatus 40 for cutting vegetation and simultaneously treating the cut vegetation with a treatment fluid, and for numerous other vegetation management applications.

FIG. 2 is a schematic flow diagram of the preferred components of the BURCH WET BLADE™ system. Preferably, bushog mower 42 is powered by a conventional power take-off 44 from the tractor 43. The power take-off 43 cooperates with cutting blade drive means 60 for driving cutting and treating means 90. Fluid container means 130 is provided for containing the treatment fluid in a plurality of sealed cells, as will be described hereinafter. Pumping means 150 pumps the treatment fluid from the fluid container means 130 through the cutting blade drive means 60 to the cutting and treating means 90. Flow control means 160 may be provided for metering the amount of the treatment fluid which is delivered by pumping means 150 to cutting and treating means 90. Fluid conduit means 190 defines a continuous fluid passageway for delivering the treatment fluid from fluid container means 130 to cutting and treating means 90 which is small enough in diameter so that the passageway is continuously filled with treatment fluid regardless of the ground speed of the mower under normal mowing conditions. Thus, the fluid conduit means 90 delivers a continuous stream of treatment fluid at a variable fluid column rate of flow which results in a constant volume of treatment fluid, usually measured in gallons per acre, being applied to the area being treated, while the fluid passageway remains completely filled. In particular, the fluid conduit means delivers a continuous stream of treatment fluid to the area being treated that is less than about 2.5 gallons per acre, and preferably between about 1.0 and about 2.5 gallons per acre. This low rate of application of the treatment fluid is unique to the Burch effect and is not obtainable with any other known system for applying treatment fluid to vegetation.

FIG. 3 is an enlarged perspective view of the bushog mower 42. Bushog mower 42 may be any conventional bushog mower. As shown, the bushog mower 42 is a model A-72 manufactured by Alamo Industrial of Seguin, Tex., which is modified to be equipped with the BURCH WET BLADE™ system. The cutting blade drive means 60 of bushog mower 42 is powered by the power take-off 44 from tractor 43. Power take-off 44 may comprise a rotating drive shaft (not shown) which cooperates with cutting blade drive means 60 as will be described to rotate cutting and treating means 90 at speeds between about 12,000 feet per minute (fpm) and 19,000 fpm at the tip of the cutting blade. Accordingly, each cutting blade of the bushog mower 42 may approach a speed of about two hundred (200) miles per hour.

Bushog mower 42 comprises a mower deck 50 for mounting cutting blade drive means 60 thereto and for housing cutting and treating means 90. Fluid container means 130 and pumping means 150 are preferably mounted to mower deck 50, but may be mounted to tractor 43. Flow control means 160 and fluid conduit means 190 are mounted to mower deck 50 and to tractor 43 as required. One end of attachment means 45 is mounted to mower deck 50, and the other end is secured to tractor 43 so that mower 42 may be pulled behind the tractor.

Mower deck 50 may be any size and shape necessary to mount cutting blade drive means 60 thereon, and to house cutting and treating means 90. As shown, mower deck 50 comprises a generally planar, horizontal topside 51, a generally planar, horizontal bottomside 52 opposite topside 51, a pair of opposed, generally planar sides 53 depending vertically downward from topside 51, a generally planar front edge 54 depending vertically downward from topside 51, and an arcuate rear edge 55 depending vertically downward from topside 51. Horizontal bottomside 52 and vertically depending sides 53, front edge 54 and rear edge 55 form an integral housing for enclosing cutting and treating means 90. Rear edge 55 preferably comprises a plurality of debris chains 56 for preventing large objects, such as stones, from being ejected rearwardly from underneath the mower. A second plurality of debris chains 56 depending downwardly from bottomside 52 may be provided for preventing large objects from being ejected frontwardly from underneath the mower.

Mower deck 50 has a central opening 57 therethrough for receiving cutting blade drive means 60 therein as will be described. At least one, and preferably two, wheels 58 are secured to the topside 51 of mower deck 50 for supporting the cutting blades of the mower 42 at a suitable height above the ground. The wheels 58 are preferably adjustable so that the elevation of the mower deck 50, and thus the distance of the cutting blades from the ground, may be positioned at any height. The mower deck 50, as described thus far, is a conventional mower deck of a bushog mower and may be replaced with any mower deck adapted for mounting cutting blade drive means 60 thereon and housing cutting and treating means 90.

The cutting blade drive means 60 is mounted to the topside 51 of the mower deck 50 adjacent the central opening 57. A power means, such as a gasoline engine or a hydraulic motor, for powering cutting blade drive means 60 may be secured to the topside 51 of the mower deck 50. As previously described, however, cutting blade drive means 60 is preferably powered by power take-off 44 from tractor 43. FIG. 4 is a sectional view of the cutting blade drive means 60 of the bushog mower 42. The cutting blade drive means 60 comprises a bevel gear 61 for cooperating with a driving gear (not shown) provided on the end of the rotating drive shaft of the power take-off 44. Bevel gear 61 in turn transfers the torque from the rotating drive shaft of the power take-off 44 to a drive shaft 62 which is rotatably received in central opening 57 of mower deck 50. The drive shaft 62 is rotated at a rate determined by the revolutions per minute of the rotating drive shaft of the power take-off 44 (or hydraulic motor) and the ratio of the teeth of the driving gear to the teeth of the bevel gear 61 (or the ratio of the hydraulic pump to the hydraulic motor).

Cutting blade drive means housing 63 is secured by capscrews 64 to an I-beam stiffener 65 which is fixed to the topside 51 of mower deck 50. Annular, lower spherical bearing 66 and annular, upper spherical bearing 67 are positioned within a central opening provided in housing 63 to permit drive shaft 62 to rotate freely. The upper end 68 of drive shaft 62 is externally threaded to receive a hex nut 69 for securing bevel gear 61 thereon. The lower end 70 of drive shaft 62 is likewise externally threaded to receive a hex nut 71 for securing cutting and treating means 90 thereon as will be described. The cutting blade drive means 60, as described thus far, is a conventional cutting blade drive means of a bushog mower and may be replaced by any conventional cutting blade drive means adapted to transfer torque to rotating drive shaft 62 for driving cutting and treating means 90.

Most importantly, an opening 72 provided in the base 73 of cutting blade drive means housing 63 is tapped and threaded to receive a fluid-tight fitting 74. Fitting 74 is adapted to be in fluid communication with fluid container means 130 as will be described. An annular flange 75 is secured to the underside of the base 73 of housing 63 by capscrews 64. Flange 75 comprises a medial wall 76 having a circumferential pocket 77 formed therein. A well 78 is formed in the upper surface of the flange 75 opposite opening 72 in housing 63. The well 78 terminates in a radial bore 79 formed in flange 75. Bore 79 is closed by a fluid-tight setscrew 80 at one end and extends inwardly to pocket 77.

A first radial bore 81 is formed in drive shaft 62 adjacent the pocket 77 of flange 75. Annular upper and lower seals 82, such as Federal Mogul Part No. 62-85-8, form a fluid-tight seal between the pocket 77 and the external surface of drive shaft 62 so that bore 79 of flange 75 is in continuous fluid communication with bore 81 of drive shaft 62. Bore 81 extends inwardly and terminates in a longitudinally extending axial bore 83 formed in drive shaft 62 and closed by a fluid-tight set screw 84. A second radial bore 85 formed in drive shaft 62 extends outwardly from axial bore 83 for communicating with cutting and treating means 90 as will be described. The setscrew 84 is guarded, such as by countersinking as shown, from striking immovable objects and is removable to permit clean-out of axial bore 83.

FIG. 5a is an elevation view and partial sectional view, and FIG. 5b is a top view, of the cutting and treating means 90 of the bushog mower 42. Cutting and treating means 90 comprises blade carrier 92 and at least one cutting blade assembly 100. Preferably, as shown, cutting and treating means 90 comprises a pair of radially opposed cutting blade assemblies 100. Blade carrier 92 preferably comprises an upper half 91 and a reverse, or mirror, lower half 93 secured to the upper half in fluid-tight arrangement. Lower half 93 has a plurality of internally threaded holes for receiving a plurality of countersunk hex head bolts therein to secure upper half 91 to lower half 93. A suitable gasket (not shown) may be utilized to provide a fluid-tight seal between upper half 91 and lower half 93. A central opening 94 is provided at the center of blade carrier 92 for receiving drive shaft 62 of cutting blade drive means 60 therethrough. An opening 95 is also provided in carrier blade 92 for receiving each at least one cutting blade assembly 100 therethrough adjacent a radially outer end of the blade carrier.

As best shown in FIG. 4, the lower end 86 of drive shaft 62 received in central opening 94 of blade carrier 92 is externally threaded with male threads. The central opening 94 of blade carrier 92 is internally threaded, preferably with female threads to engage the male threads of lower end 86 of drive shaft 62 so that the blade carrier remains tightly secured to the cutting blade drive means 60. An annular spacer 87 is received on drive shaft 62 between a shoulder 88 provided on the shaft and the upper half 91 of blade carrier 92 for spacing the blade carrier from the bottomside 52 of mower deck 50. Spacer 87 is made of a hard, rigid metal such as 5160 steel, while blade carrier 92 is made of a softer, somewhat flexible metal for a purpose to be described. A lock washer and a hex head jam nut 89 are threaded onto the lower end 86 of drive shaft 62 to secure spacer 87 and blade carrier 92 tightly against shoulder 88.

A fluid channel 96 (FIG. 4) is formed in upper half 91 and lower half 93 of blade carrier 92 and extends outwardly from central opening 94 in the direction of opening 95. A first circumferential pocket 97 is formed in a medial portion of central opening 94 adjacent second radial bore 85 of drive shaft 62 so that channel 96 is in continuous fluid communication with radial bore 85 as the shaft rotates the cutting and treating means 90. Channel 96 terminates in a second circumferential pocket 98 (FIG. 5c) formed in a medial portion of opening 95 so that blade carrier 92 is in fluid communication with each at least one cutting blade assembly 100.

As shown in FIG. 5c, cutting blade assembly 100 comprises a shaft 102 which is rotatably received in opening 95 so that the cutting blade assembly can rotate relative to the blade carrier 92 if the cutting blade 105 strikes an immovable object, such as the top of a buried rock. The upper end 101 of shaft 102 has a hex head jam nut formed thereon for removing and replacing a cutter blade hub 104 on blade carrier 92 as will be described. The lower end 103 of shaft 102 is externally threaded with male threads for receiving the cutting blade hub 104 thereon. Cutting blade hub 104 is internally threaded, preferably with female threads to engage the male threads of lower end 103 of shaft 102 so that the cutting blade hub remains tightly secured to the shaft of the cutting blade assembly.

An annular lower spherical bearing 106 and an annular upper spherical bearing 107 are press fit into opening 95 of blade carrier 92 to permit shaft 102, and thus cutting blade assembly 100, to rotate as required. An upper boss 108 is welded to the upper half 91 of the blade carrier 92, and a lower boss 109 is welded to the lower half 93 of the blade carrier 92 to secure the upper and lower bearings in opening 95. The cutting blade assembly 100, as described thus far, is a conventional cutting blade assembly for a bushog mower and may be replaced with any cutting blade assembly adapted for mounting at least one cutting blade 105 on blade carrier 92 for cutting vegetation and treating the cut vegetation with a treatment fluid.

A radial bore 110 is formed in shaft 102 adjacent the circumferential pocket 98 of blade carrier 92. Annular upper and lower seals 82, such as Federal Mogul Part No. 62-85-8, form a fluid-tight seal between the pocket 98 and the external surface of shaft 102 so that the radial bore 110 of the shaft is in continuous fluid communication with the channel 96 of carrier blade 92. Radial bore 110 extends inwardly and terminates in a longitudinally extending axial bore 111 formed in shaft 102 and closed by a fluid-tight plug 112 which is welded to the underside of cutting blade hub 104. The plug 112 is stepped to define a fluid reservoir between one-half of the lower surface of the lower end 103 of shaft 102 and one-half of the upper surface of the plug.

A bore 113 is formed in cutting blade hub 104 and closed by a fluid-tight set screw 114 on the side opposite the cutting blade 105. The bore 113 extends outwardly from the fluid reservoir in the direction of cutting blade 105 and terminates adjacent a small gap 115 between the cutting blade hub 104 and the underside 116 of the cutting blade. The gap 115 is preferably between about 0.25 and 1.0 inches wide, and more preferably is about 0.5 inches wide. It has been discovered that the width of gap 115 is essential to the operation of the BURCH WET BLADE™ system. If the gap 115 is too wide (i.e., greater than about 1.0 inch wide), there is insufficient capillary attraction of the treatment fluid to the underside 116 of the cutting blade 105 to maintain a continuous stream of treatment fluid. If the gap 115 is too small (i.e., less than about 0.25 inches wide), the droplets of treatment fluid exiting the bore 113 are not thinned and the capillary attraction may not be sufficient to maintain the continuous steam of treatment fluid on the underside 116 of the cutting blade 105. Accordingly, the treatment fluid may be broadcast and contaminate the surrounding soil and the underground water system. Bore 113 may also be rifled to impart a slight vortex to the column of treatment fluid exiting the bore. It is believed that the vortex motion of the column improves the capillary attraction of the continuous stream of treatment fluid to the underside of the cutting blade by preventing the droplets from expanding radially in the gap 115.

FIG. 6a is an elevation view and partial sectional view, and FIG. 6b is a top view, of an alternative embodiment of the cutting and treating means 90 of the bushog mower 42. The cutting and treating means 90 comprises a disk-shaped blade carrier 122 and four orthogonally spaced cutting blade assemblies 100. The disk blade carrier 120 preferably comprises an upper half 121 secured to a lower half 123 as previously described and as illustrated in the partial sectional view of FIG. 6a. However, second radial bore 85 formed in drive shaft 62 may be located above the top surface of the disk blade carrier 122 for communicating with a conduit 124 extending between the second radial bore and axial bore 111 of shaft 102 in the manner previously described as illustrated in FIG. 6c. When conduit 124, or any other fluid treatment conduit is located above the disk blade carrier 122 and below the mower deck 50, an annular ring guard 125 depending vertically downward from the bottomside 52 of the mower deck is preferably utilized to prevent large objects, such as stones, from striking and damaging the conduit 124.

Figure 7:
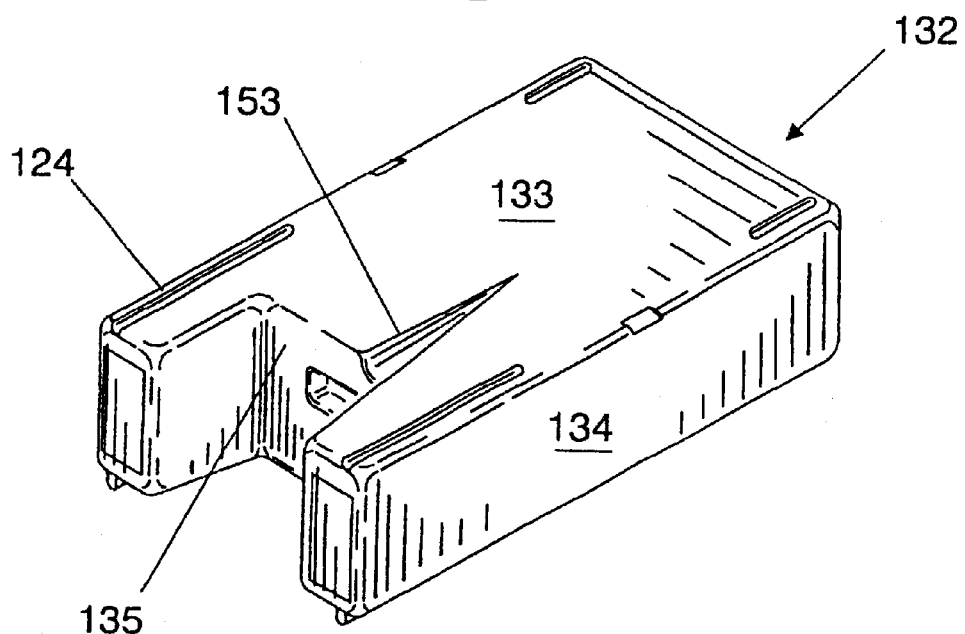
FIG. 7 is a perspective view of the fluid container means of the bushog mower of FIG. 1b.

FIG. 7 is a perspective view of the fluid container means 130 of the bushog mower 42. Fluid container means 130 comprises at least one fluid container cell 132, referred to herein as a Burch FLO-THRU CELL™, made of a material which is substantially resistant to ultraviolet light, such as polyurethane, polyethylene or polyvinylchloride (PVC) plastic. Preferably, as shown, fluid container means 130 comprises a plurality of FLO-THRU CELL™ 132 removably stacked and supported on the topside 51 of mower deck 50 between stanchions 59. Cells 132 are restrained against horizontal movement by stanchions 59, and a strap (not shown) may be utilized to restrain the cells 132 against vertical movement. The FLO-THRU CELL™ 132 may be filled with the treatment fluid at a remote location and then transported to the worksite to prevent the possibility of a spill that may contaminate the surrounding soil and the underground water supply at the worksite. The cells 132 may also be filled under vacuum and hermetically sealed to preserve the potency of the formulation. Thus, the Burch FLO-THRU CELL™ provide an environmentally safe and effective means for supplying the treatment fluid to the mower 42. It should be noted that fluid container means 130 may be utilized with a variety of rotary mowers and is not limited to use with the bushog mower 42 described herein. Further, it should be noted that the fluid container means 130 may comprise one or more Burch FLO-THRU CELL™ containing the treatment fluid and a separate fluid storage container containing an inert solution (e.g., water) for mixing with the treatment fluid. Preferably, the treatment fluid and the inert solution are combined in, for example, an injection mixing chamber at the work site during the application process. Accordingly, the concentration of the mixture can be varied and fewer FLO-THRU CELL™ need be stored and transported to the work site.

Figure 8:
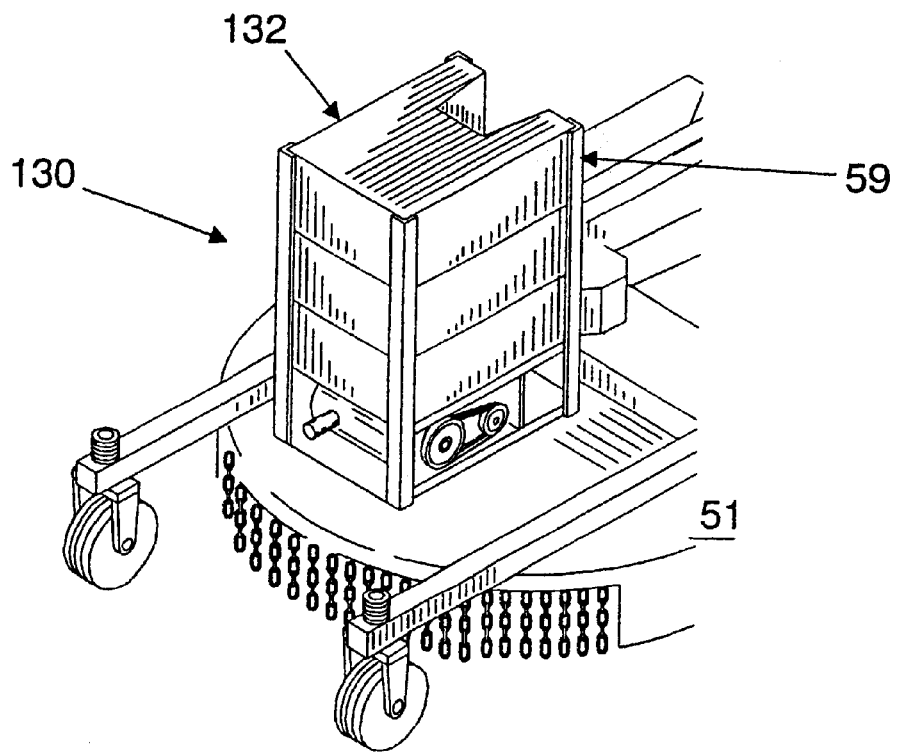
FIG. 8 is a perspective view of a FLO-THRU CELL® of the fluid container means of the bushog mower of FIG. 1b.
Figure 10A:
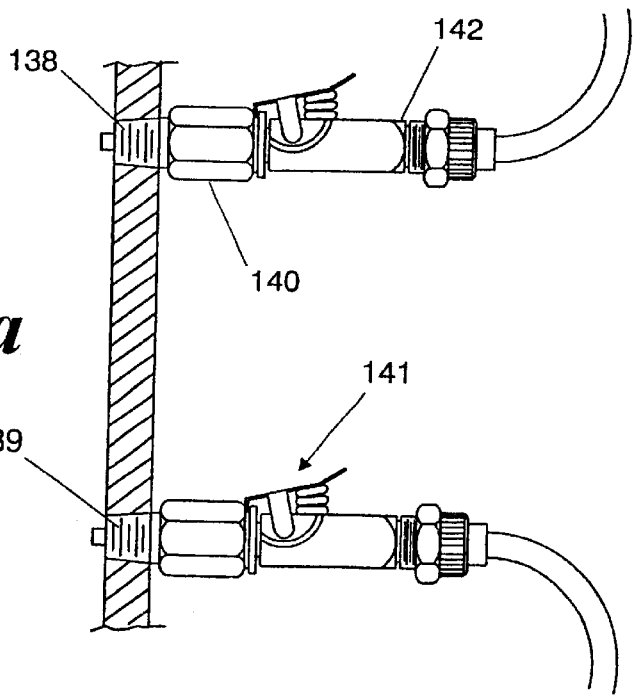
Figure 10:
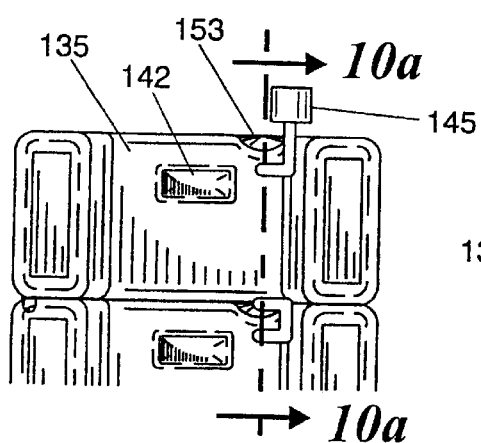
FIG. 10 is an end view of the FLO-THRU CELL™ of FIG. 8.
Figure 9:
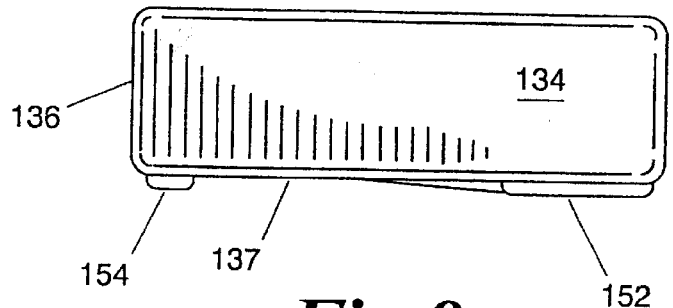
FIG. 9 is a side view of the FLO-THRU CELL™ of FIG. 8.

FIG. 8 is a perspective view, FIG. 9 is a side view and FIG. 10 is an end view of a FLO-THRU CELL™ 132 of the fluid container means 130 of the bushog mower 42. Each cell 132 comprises a topwall 133, sidewalls 134, a front endwall 135, a rear endwall 136 and a bottomwall 137. Each cell 132 further has an inlet port 138 and an outlet port 139 formed therein. As illustrated in FIG. 10a, each inlet port 138 is configured with the female end 140 of a double end shutoff fitting 141, such as a Parker POLY-TITE® Fitting Part No. 398PD, manufactured by Parker Hannifin Corporation of Otsego, Mich., to receive the male end 142 of the coupler fitting. The male end 142 of the fitting comprises a spring-loaded release arm so that the fitting 141 may be readily disconnected to replace an empty FLO-THRU CELL® 132. A first segment of flexible tubing extends outwardly from the lowermost cell 132 and is connected to a second segment of flexible tubing with a Parker POLY-TITE® bulkhead fitting through the wall of the housing of the pumping means 150. The second segment of flexible tubing passes through the pumping means 150 and terminates at the fitting provided on the housing 63 of the cutting blade cutting blade drive means 60.

As seen in FIG. 10, an in-line filter and breather cap 145 allows ambient air to enter the fluid container cell 132 so that a partial vacuum does not develop and inhibit the flow of the treatment fluid as pumping means 150 extracts the treatment fluid from the cell. Each FLO-THRU CELL™ 132 further has a handhold 142 disposed on front endwall 135 and rear endwall 136 for assisting an operator to transport a filled cell. As seen in FIGS. 7 and 9, bottomwall 137 of cell 132 comprises a guide 152 and feet 154. Guide 152 slidably engages a groove 153 on the topwall 133 of a lower cell 132 and thereby substantially prevents lateral movement of the stacked FLO-THRU CELL™ 132. In addition, feet 154 are also in contact with notches 124 on topside 133 to minimize relative motion between adjacent stacked cells 132.

A single FLO-THRU CELL™ 132 may be utilized if only a small area is to be cut, and thus a relatively small amount of treatment fluid is to be applied to the cut vegetation. A single cell 132 may also be utilized if it is desired to apply a predetermined number of FLO-THRU CELL™ containing the same treatment fluid to an area, or if it is desired to apply different treatment fluids to the same area. For example, a first FLO-THRU CELL™ pre-filled with a fluid crabgrass herbicide treatment may be used to simultaneously apply crabgrass herbicide to the remaining stems of the vegetation at the same time that the vegetation is cut. Thereafter, the FLO-THRU CELL™ containing the crabgrass herbicide may be removed and replaced with a second FLO-THRU CELL™ containing a cleansing solution to flush the fluid conduit means 190. The FLO-THRU CELL™ containing the cleansing solution may then be removed and replaced with a third FLO-THRU CELL™ containing a fluid fungicide. The height of the cutting blade above the surface of the ground is reduced to expose the remaining stems to the cutting blade, and the fungicide is applied as the vegetation is cut again.

However, it is preferred that at least two FLO-THRU CELL™ 132 be used so that the level of the treatment fluid does not fall below the level of the outlet port 139 of the lowermost cell regardless of the orientation of the cutting blades of the mower relative to the FLO-THRU CELL™ 132. The use of a plurality of FLO-THRU CELL™ 132 permits an area to treated at one time which would otherwise be too large to be safely treated with a single fluid container cell. Further, the use of a plurality of FLO-THRU CELL™ 132 permits a large area to treated at one time without the need to repeatedly discontinue the cutting and treating operation to refill a single large fluid treatment container. Instead, the upper FLO-THRU CELL™ 132 may be readily removed and replaced with additional pre-filled cells.

Figure 3:
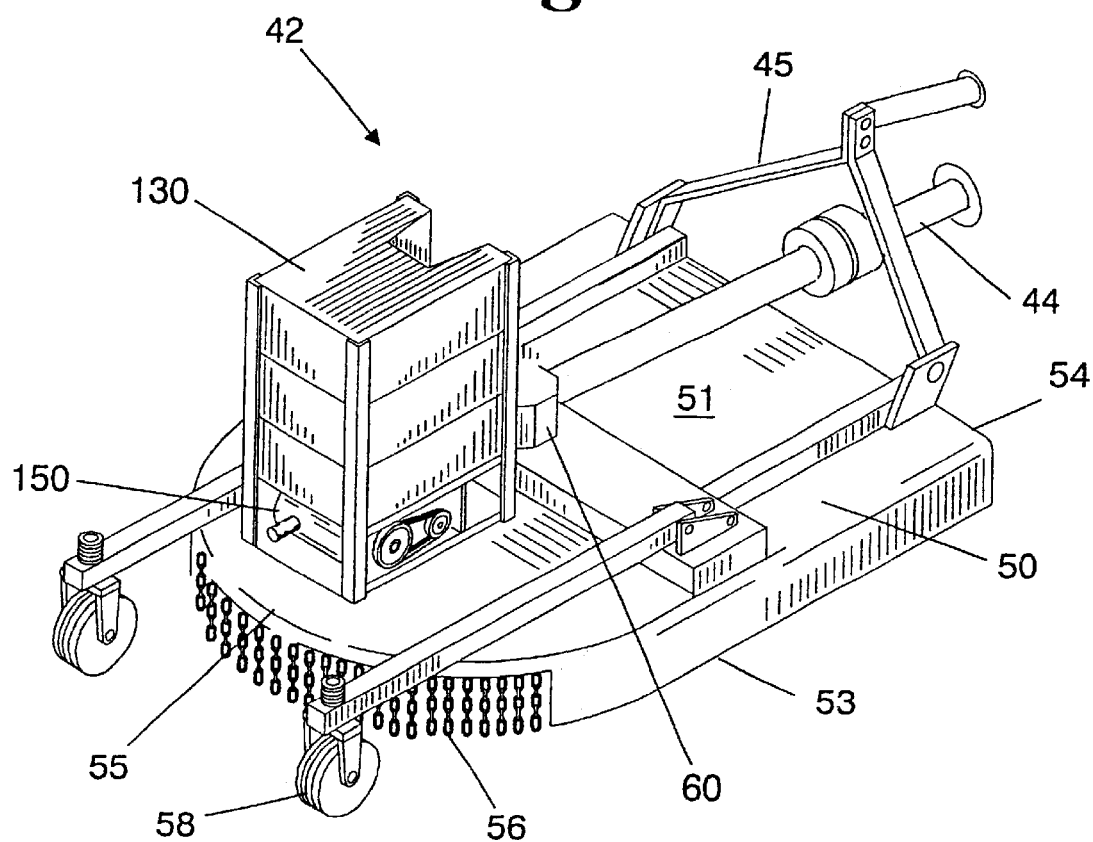
FIG. 3 is an enlarged perspective view of the bushog mower of FIG. 1b.

Pumping means 150 (FIG. 3) pumps the treatment fluid from the fluid container means 130 to the cutting blade drive means 60 so that a stream of treatment fluid is continuously available to the translocation streams of the remaining stems of the cut vegetation at the time that the vegetation is cut. Pumping means 150 comprises any type of variable capacity pump for pumping widely varying amounts of the treatment fluid depending on the speed of the mower over the surface of the ground, as will be described. Preferably, however, pumping means 150 is a peristaltic pump of the type available from TAT Engineering of Branford, Connecticut, which pumps the treatment fluid through fluid conduit means 190 via waves of contraction at a pressure of about 5 psi produced mechanically by a series of rollers compressing the flexible tubing containing the treatment fluid.

Figure 11:
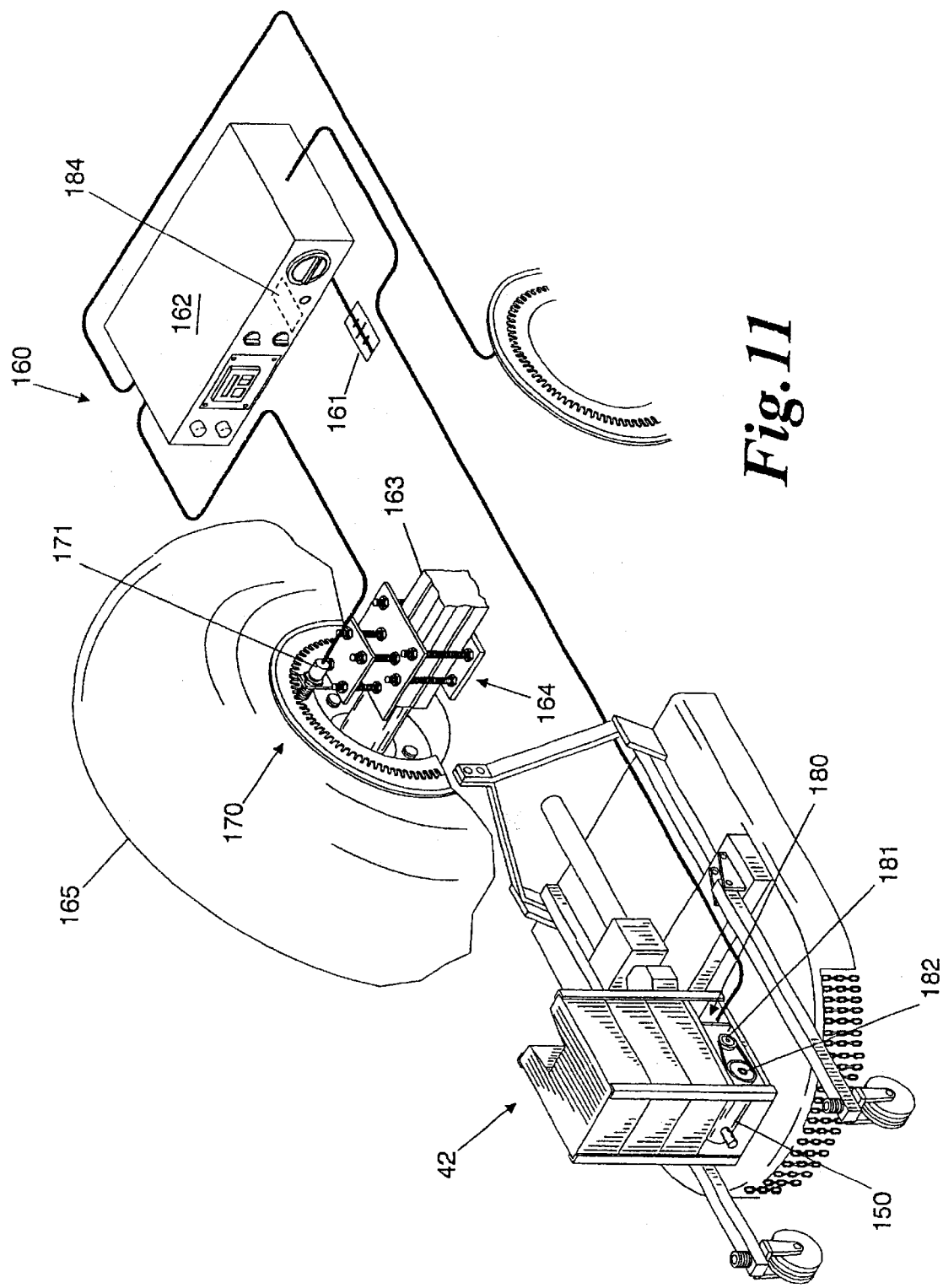
FIG. 11 is a perspective view showing the preferred components of the flow control means of the bushog mower of FIG. 1b.
Figure 15:
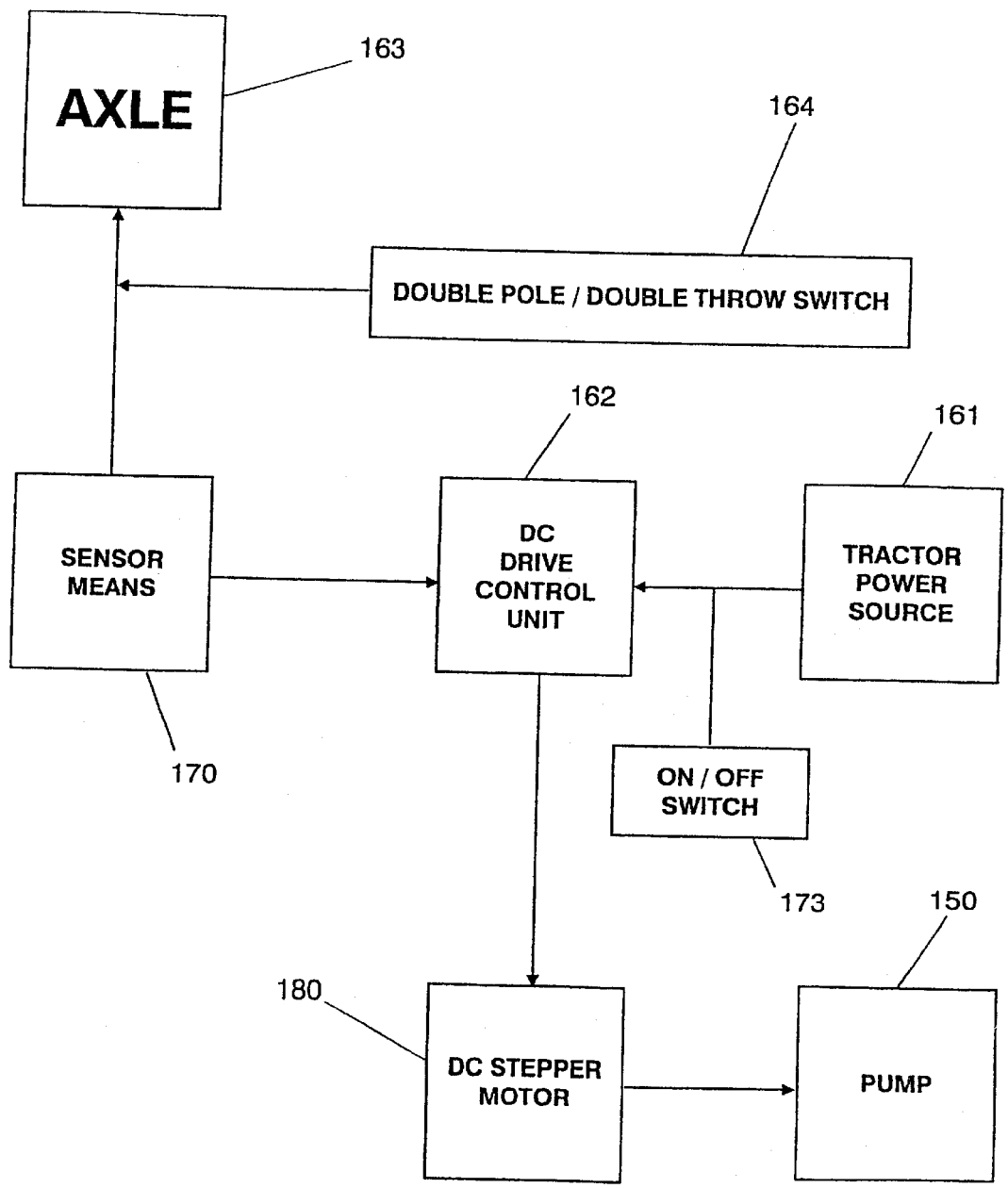
FIG. 15 is a schematic flow diagram illustrating the connection of the preferred components of the flow control means of FIG. 12.

FIG. 11 is a perspective view of the preferred components of the flow control means 160, and FIG. 15 is a schematic flow diagram illustrating the connection of the preferred components of the flow control means. Flow control means 160 comprises a control unit 162 which is preferably powered by a power source from the tractor 43, such as 12 volt battery 161. Control unit 162 is electrically coupled to a ground speed detection means 164 preferably located on the rear axle 163 of tractor 43 adjacent each wheel 165. As shown in FIGS. 12 and 13, the detection means 164 comprises a cup-shaped flange carrier 166 having a hole pattern comprising holes 167 for receiving the lugs of the axle 163. The flange carrier 166 is positioned over the outer end of the axle 163 and extends inwardly so that the radially outwardly extending flange 168 of flange carrier 166 is adjacent an adjustable sensing means 170 secured to axle 163. Sensing means 170 is typically positioned within a removable housing (not shown) which protects the sensor 171 from the elements and debris which may come into contact with the axle 163.

Flange 168 is preferably made of a ferrous metal and comprises a predetermined plurality of radial teeth 172 spaced apart on the periphery of the flange. Sensor 171 is preferably a proximity sensor that detects the passing teeth 172 as the flange carrier 166 rotates with the shaft of axle 163. Sensor 171 may be any electronic sensor such as an inductance, magnetic or optical sensor, which produces an electrical signal proportional to the angular velocity of the flange carrier 166, and thus the speed of the wheel 165 of the tractor 43. A sensor which can detect through a viscous fluid, such as oil, may also be utilized so that the sensor may be located in the gear box of the rear axle, or in a speedometer cable attached to the rear axle of the tractor. Preferably, a separate ground speed detection means 164 is secured to each wheel 165 of the tractor 43 and the electrical signal from each detection means is provided to control unit 162. Thus, the electrical signal having the greatest velocity value may be selected, or the electrical signals from both detection means 164 may be combined and averaged, or may be combined, averaged and multiplied by a correction factor, so that the most accurate estimate of the ground speed of the bushog mower 42 is determined.

FIG. 14 is a front view of the control unit 162, manufactured by ESSCO, Inc., of Greensboro, North Carolina, of the flow control means 160. The control unit 162 comprises an on-off switch 173 for providing power to the control unit from the 12 volt battery 161 of tractor 43. Switch 173 is preferably a combination 12 volt to 24 volt DC voltage converter and a 24 volt DC voltage regulator. Control unit 162 further comprises a programmable operator interface, such as a Mitsubishi MTA-10 processor 174 for processing predetermined data provided by the operator, such as the width of the cut made by the cutting and treating means 90 and the volume of treatment fluid to be applied to the area treated, and the electrical signals from the ground speed detection means 164. Processor 174 preferably comprises a data screen and keypad 175 for scrolling the command line displayed on data screen and for editing the predetermined data utilized by the processor 174 to determine the ground speed of the mower 42.

Control unit 162 further comprises an on-off toggle switch 176 for powering pumping means 150, and a by-pass toggle switch 177 for by-passing the pumping means, for example when the operator desires to move the tractor 43 without applying treatment fluid to vegetation. Control unit 162 further comprises a green light-emitting-diode (LED) 178 for indicating that the pumping means 150 is powered and operating (i.e., for example when the tractor 43 is moving, or the by-pass is engaged for flushing treatment fluid from the conduit means 190), and a red LED 179 for indicating that the pumping means 150 is powered, but is not operating (i.e., for example when the tractor 43 is not moving).

Preferably, control unit 162 is also electrically coupled to a DC stepper drive motor 180 for driving the peristaltic pump of pumping means 150. Processor 174 provides an electrical signal to stepper drive motor 180 that is proportional to the estimated ground speed of the mower 42, and the stepper drive motor 180 drives the peristaltic pump in fine increments so that a controlled amount of treatment fluid is applied by the cutting and treating means 90 to the vegetation. Stepper drive motor 180 is preferably a 250 step linear drive motor of the type manufactured by Intelligent Motions Systems Inc., of Branford, Connecticut. The output shaft of stepper drive motor 180 is fixed to a first pulley 181 which drives a second pulley 182 fixed to the output shaft of the peristaltic pump of pumping means 150. The ratio of the first pulley 181 to the second pulley 182 may be any ratio, but is preferably 1.0/1.5 so that the maximum speed of the peristaltic pump is not exceeded.

Control Unit 162 may further comprise a global positioning satellite (GPS) transceiver 184 for communicating with a remote base station via a satellite. The transceiver 184 receives and transmits position data relating to the location of the tractor 43 and the mower 42 as the vegetation is being treated with the treatment fluid. Accordingly, a permanent record of the area that was treated can be maintained for purposes of, for example, disputing the tort claims of farmers and owners of land adjoining the right-of-way or roadside that a toxic treatment fluid was broadcast onto land adjacent the intended treatment area.

In an alternative embodiment, the ground speed detection means 164 may be mechanically coupled to the pumping means 150. For example, flange carrier 166 may comprise a sprocket in place of flange 168, and sensor 171 may mechanically engage the radial teeth 172 of the sprocket to drive the peristaltic pump of pumping means 150. Pumping means 150 may be directly driven by the sensor 171, or may be driven by any type of gear box for converting the output of the sensor so that the maximum speed of the peristaltic pump is not exceeded.

Fluid conduit means 190 defines a fluid passageway extending between fluid container means 130 and cutting and treating means 90. Fluid conduit means 190 delivers the treatment fluid to the underside of the cutting blade so that a stream of treatment fluid is continuously available to the vegetation at the time that the vegetation is cut. Fluid conduit means 190 preferably comprises a flexible tube 191 for example made of soft polyvinylchloride (PVC), which extends from the bottommost FLO-THRU CELL™ 132 through the rollers of the peristaltic pump of pumping means 150 to the fluid-tight fitting 74 provided on the exterior of the housing 63 of the cutting blade drive means 60. Fluid conduit means 190 further comprises well 78; radial bore 79 and circumferential pocket 77 formed in flange 75; radial bore 81, axial bore 83 and radial bore 85 formed in drive shaft 62; first circumferential pocket 97, fluid channel 96, and second circumferential pocket 98 formed in blade carrier 92; radial bore 110 and axial bore 111 formed in shaft 102 of cutting blade assembly 100; and radial bore 113 formed in cutting blade hub 104. Fluid conduit means 190 terminates adjacent gap 115 opposite the underside 116 of the cutting blade.

It is believed that the constant availability of the stream of treatment fluid at the time that the vegetation is cut is critical to the efficacy of the treatment. The combination of the capillary attraction of the underside of the cutting blade and the vortex of the treatment fluid ensures that the treatment fluid will always be available to the translocation streams of the remaining stems of the vegetation at the time that the vegetation is cut regardless of the speed of rotation of the cutting blade, the ground speed of the mower or the orientation of the cutting blade relative to the FLO-THRU CELL™. Accordingly, all of the treatment fluid is absorbed into the translocation streams of the plants when vegetation is available to the cutting blade.

Figure 16:
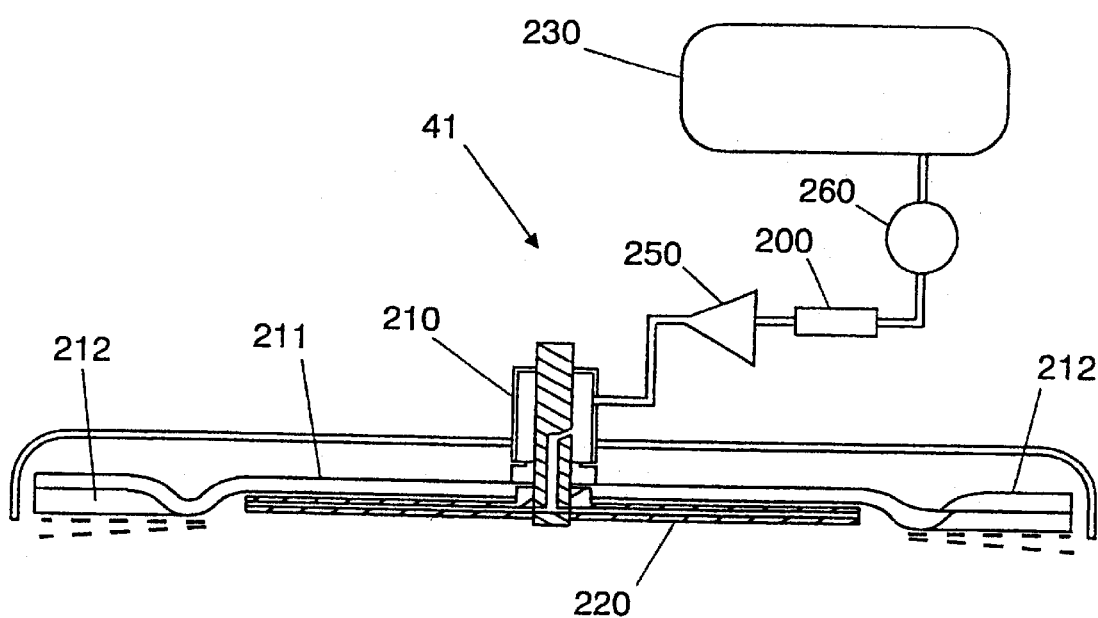

FIG. 16 is a schematic diagram illustrating the preferred components of the power lawnmower 41 shown in FIG. 1*a*. Preferably the power lawnmower 41 comprises a fluid container means 230, a flow control means 260 and a pumping means 250 which are conceptually the same as fluid container means 130, flow control means 160 and pumping 150, respectively, as previously described. The primary variation being that the components of the power lawnmower 41 are scaled to the dimensions and capabilities of the lawnmower. A filter 200, such as an in-line gasoline filter, may also be inserted before the pumping means 150 to filter particulate matter from the treatment fluid before it is introduced to the cutting blade drive means 210. Cutting blade drive means 210 is conceptually the same as cutting blade drive means 60 previously described, but comprises a manifold 220, referred to herein as the Burch WET BAR™.

A typical blade 211 for a power lawnmower is made of soft metal, and is relatively thin and measures between about 18 and 30 inches in length. Thus, as indicated by the broken lines in FIG. 16, the blade 211 is flexible about the cutting blade drive means 210 so that the tip 212 of the blade 211 will deflect upwards if the blade strikes an immovable object. Accordingly, if the blade 211 were provided with a solid fluid conduit extending outwardly from the drive shaft of the cutting blade drive means 210, the conduit would buckle as the blade flexes. The Burch WET BAR™ permits the BURCH WET BLADE® system to be utilized on a power lawnmower having a flexible cutting blade.

FIG. 17*a* is a perspective view of the Burch WET BAR™ 220 secured to the cutting blade drive means 210 of the power lawnmower 41, and FIG. 18 is a top view of the center portion of the Burch WET BAR™ shown in FIG. 17*a*. The WET BAR™ 220 comprises a fluid conduit 221 which is in fluid communication with fluid container means 230 in the manner previously described. Accordingly, a continuous stream of treatment fluid is delivered to the underside of the blade 211 and is continuously available to the cut vegetation at the time that the vegetation is cut. FIG. 17*b* is a perspective view of an alternative embodiment of the Burch WET BAR™ 220. In this embodiment, a solid fluid conduit 221 is positioned in a longitudinal channel 222 formed in the top surface of the WET BAR™ 220, and is welded to the WET BAR™ in a conventional manner. In still another embodiment, the thicker WET BAR™ 220 may be inverted and may replace the thinner blade 211 for appropriate applications.

ALTERNATIVE EMBODIMENTS

Figure 19:
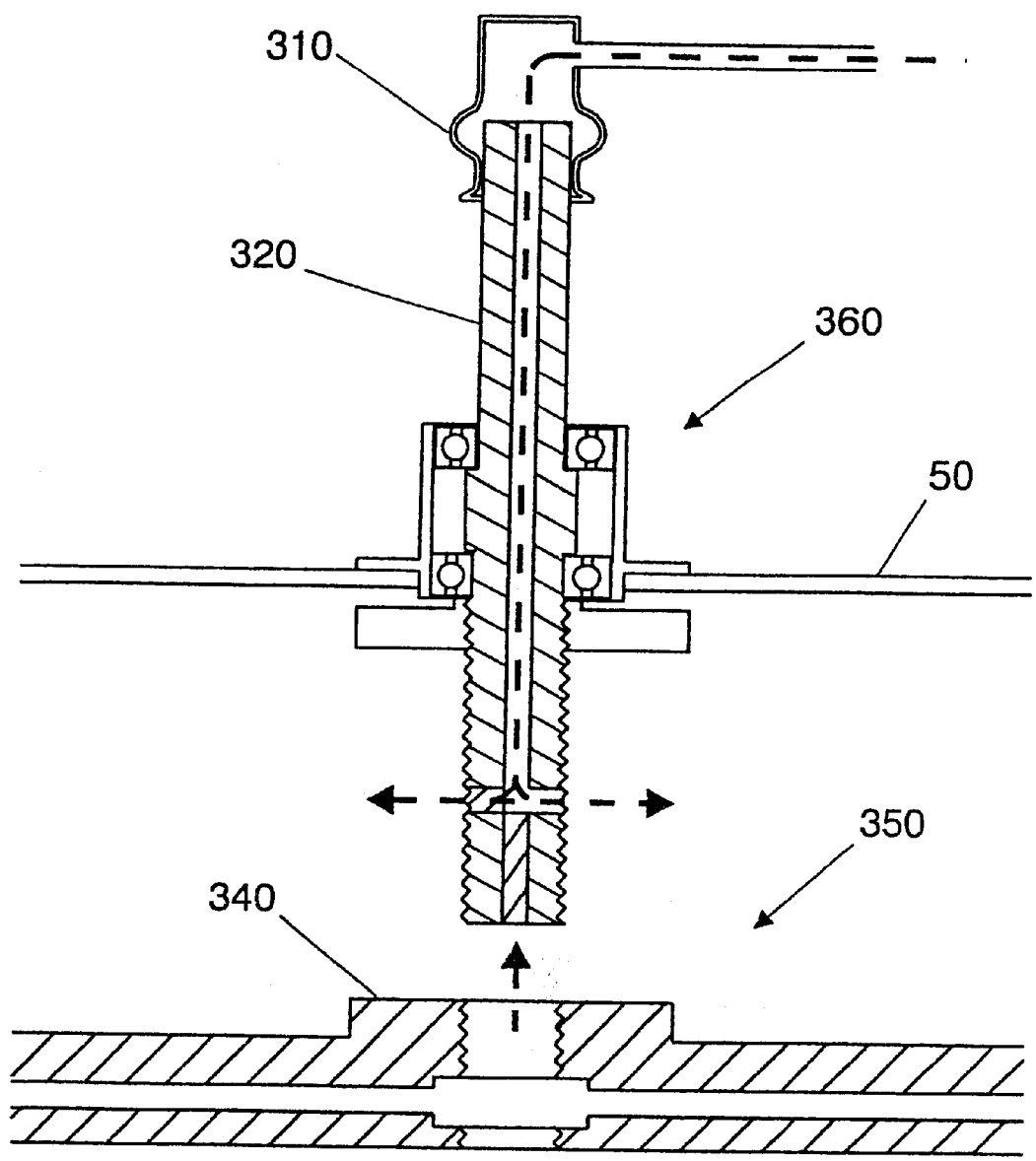
FIG. 19 is a sectional view of an alternative embodiment of a portion of the cutting blade drive means and a portion of the cutting and treating means of a mower according to the invention.
Figure 20:
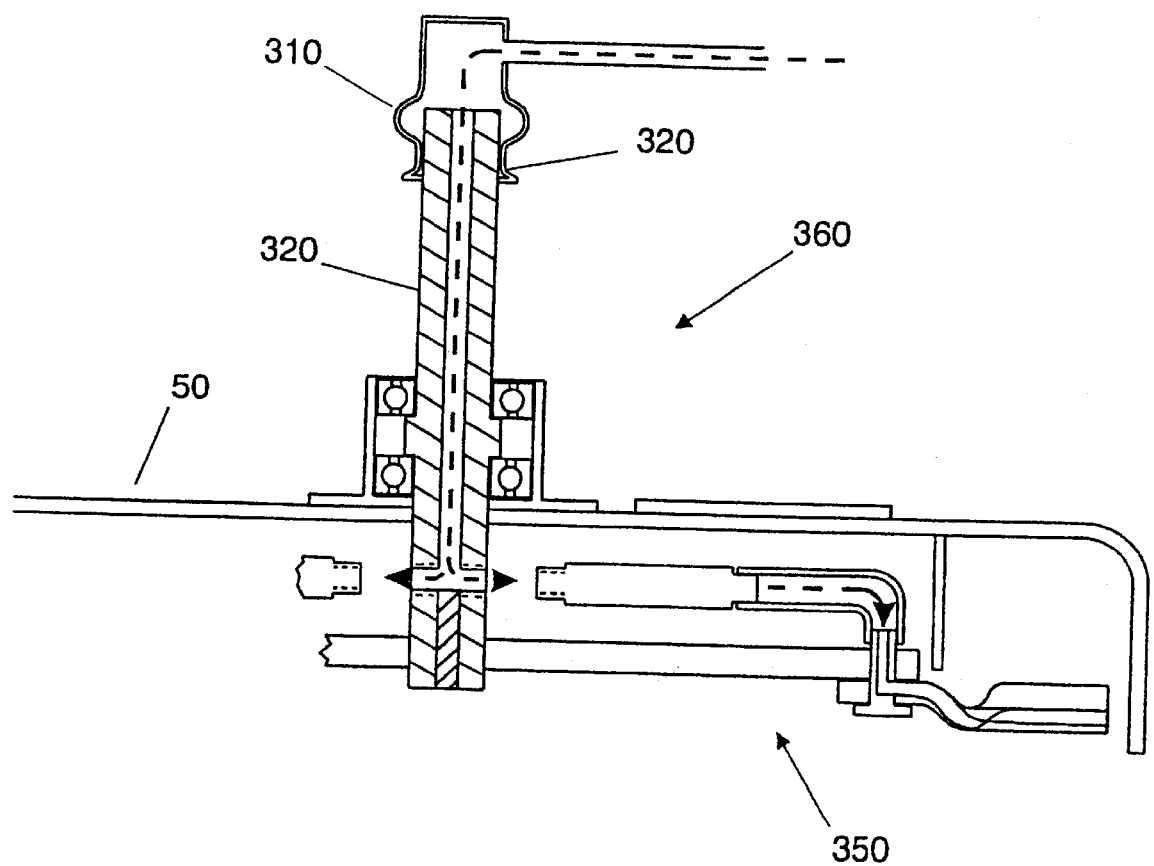
FIG. 20 is a sectional view of an alternative embodiment of a portion of the cutting blade drive means and a portion of the cutting and treating means of a mower according to the invention.

FIGS. 19 and 20 are sectional views of alternative embodiments of a portion of the cutting blade drive means 360 and a portion of the cutting and treating means 390 of a mower according to the invention. The treatment fluid passes through a cap 310 covering one end of the drive shaft 320 of the cutting blade drive means 360. The cap 310 may be any stationary cap which permits the treatment fluid to be transferred to the axial bore formed in the rotating drive shaft 320. But preferably, cap 310 is a two-piece swivel, or universal ball, joint. In the embodiment illustrated in FIG. 19, the treatment fluid is transferred to the blade carrier 340 in the manner previously described in conjunction with FIG. 6. In the embodiment illustrated in FIG. 20, the treatment fluid is transferred to the blade cutting assembly 350 in the manner previously described in conjunction with FIG. 6a.

Figure 21:
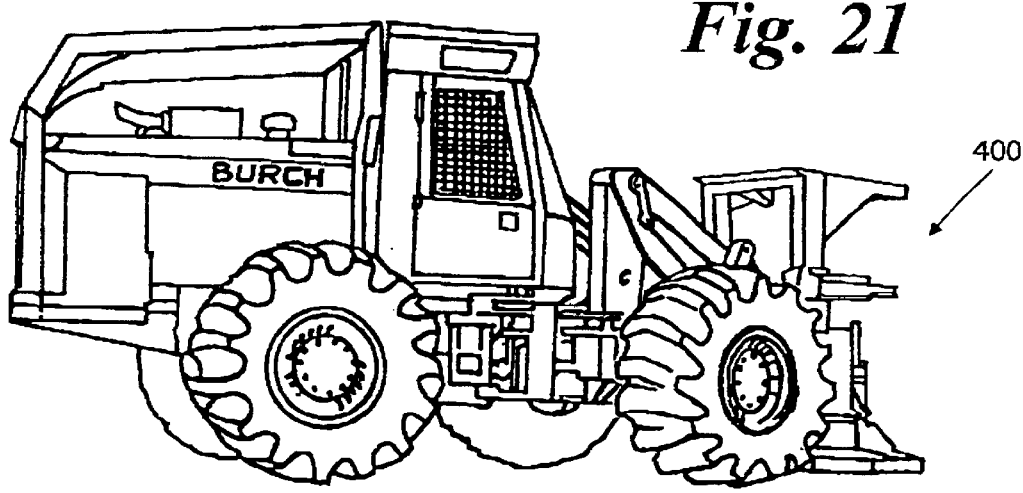
FIG. 21 is a perspective view of a hydraulic feller buncher according to the invention attached to the forward boom arm of a tractor.

FIG. 21 is a perspective view of a hydraulic feller buncher according to the invention attached to the forward boom arm of a tractor. Feller bunchers are used in forest management and rights of way. The feller buncher 400, FIG. 21, is a large piece of equipment capable of taking down trees.

Figure 22:
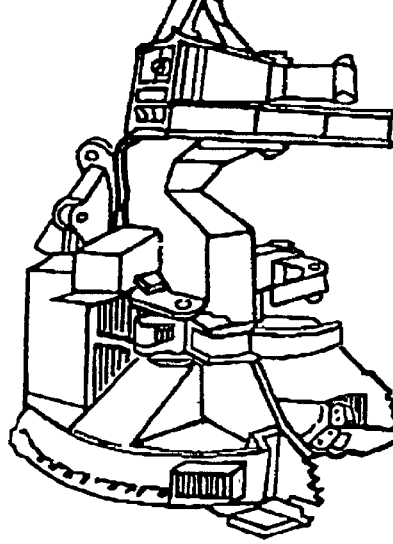
FIG. 22 is a perspective view of a high speed saw head according to the invention and adapted for use on the hydraulic feller buncher of FIG. 21.

FIG. 22 is a perspective view of a high speed saw head according to the invention and adapted for use on the hydraulic feller buncher of FIG. 21. When equipped with the saw head 402, FIG. 22, the feller buncher operates similar to a chain saw, however in this application, fluid is delivered to the bottom of the cutting edge, of the saw head, before the cut to facilitate delivery of fluids directly into the vascular system of the treated plant or tree.

Figure 23:
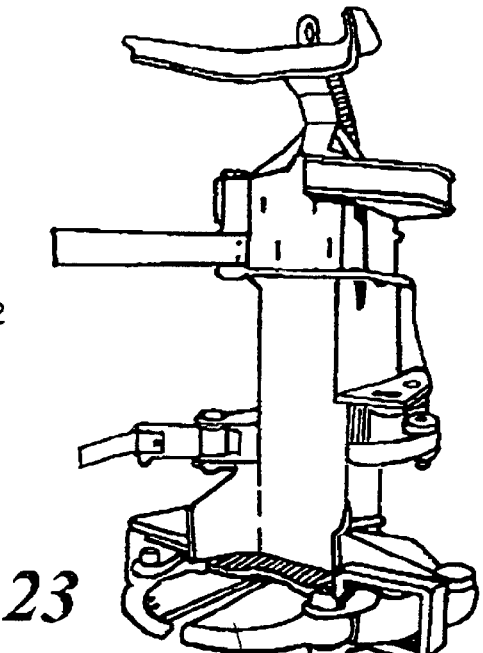
FIG. 23 is a perspective view of a high speed shear head according to the invention and adapted for use on the hydraulic feller buncher of FIG. 21.

FIG. 23 is a perspective view of a high speed shear head according to the invention and adapted for use on the hydraulic feller buncher of FIG. 21. When equipped a high speed shear head 404, FIG. 23, the feller buncher delivers a treatment fluid to the bottom of the cutting edge, of the high speed shear, before the cut facilitating delivery of fluids directly into the vascular system of the treated tree or plant.

Figure 24:
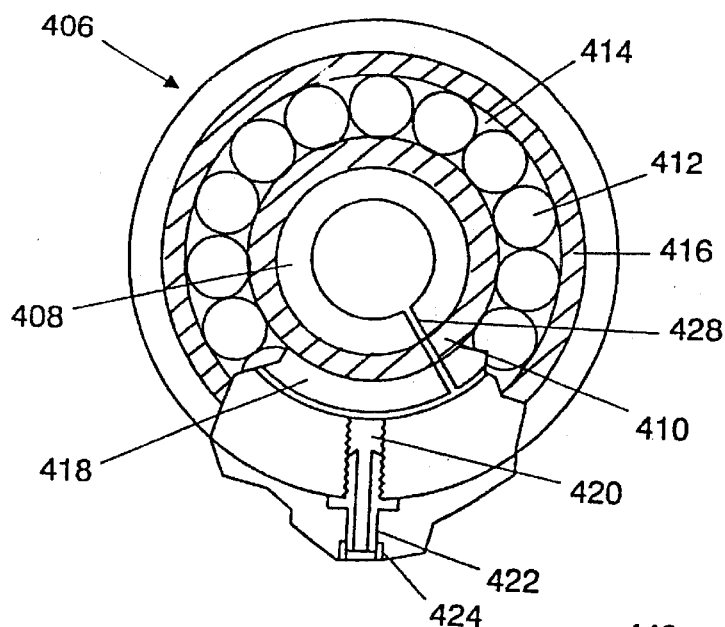
FIG. 24 is a partial sectional view of a portion of the fluid conduit means of the apparatus for cutting and treating vegetation according to the invention illustrated in FIGS. 25–32.

FIG. 24 is a partial sectional view of a portion of the fluid conduit means of the apparatus for cutting and treating vegetation according to the invention illustrated in FIGS. 25–32. Cutting mechanism other than rotary mowers, such as reel, flail bar, disk and sickle bar cutting apparatus, require controlled fluid delivery to the appropriate cutting edge at the appropriate time. The pulsing sealed hollow shaft fluid delivery apparatus 406, FIG. 24, has a ball bearing assembly and allows for timed controlled delivery of fluids. The pulsing sealed hollow shaft fluid delivery apparatus 406, has a hollow stationary shaft 408 which is press fitted at the center. About shaft 408 is fitted an inside race 410 which are in contact with ball bearings 412 packed in a seal 414 within the outside race 416. A hollow rotating shaft 418 is in sliding contact with the outside race 416. The rotating shaft 418 is fitted with hollow spokes 420, which are in communication with a fitting 422 having a nipple 424 for engagement with piping or tubing 426. At least one port or slot 428 is tapped into the stationary shaft 408 and allows fluid to flow from the stationary shaft 408 to the hollow spoke 420. During most of the rotation cycle the fluid in the system is static, from the hollow spoke 420 to just before the outlet port spaced from the blade. When slot 428 comes into alignment with hollow spoke 420 additional fluid is pulsed through the system resulting in fluid on the lower cutting edge of the blade. In this embodiment the outside fittings rotate for use with the flail bar and reel mowers.

Figure 33:
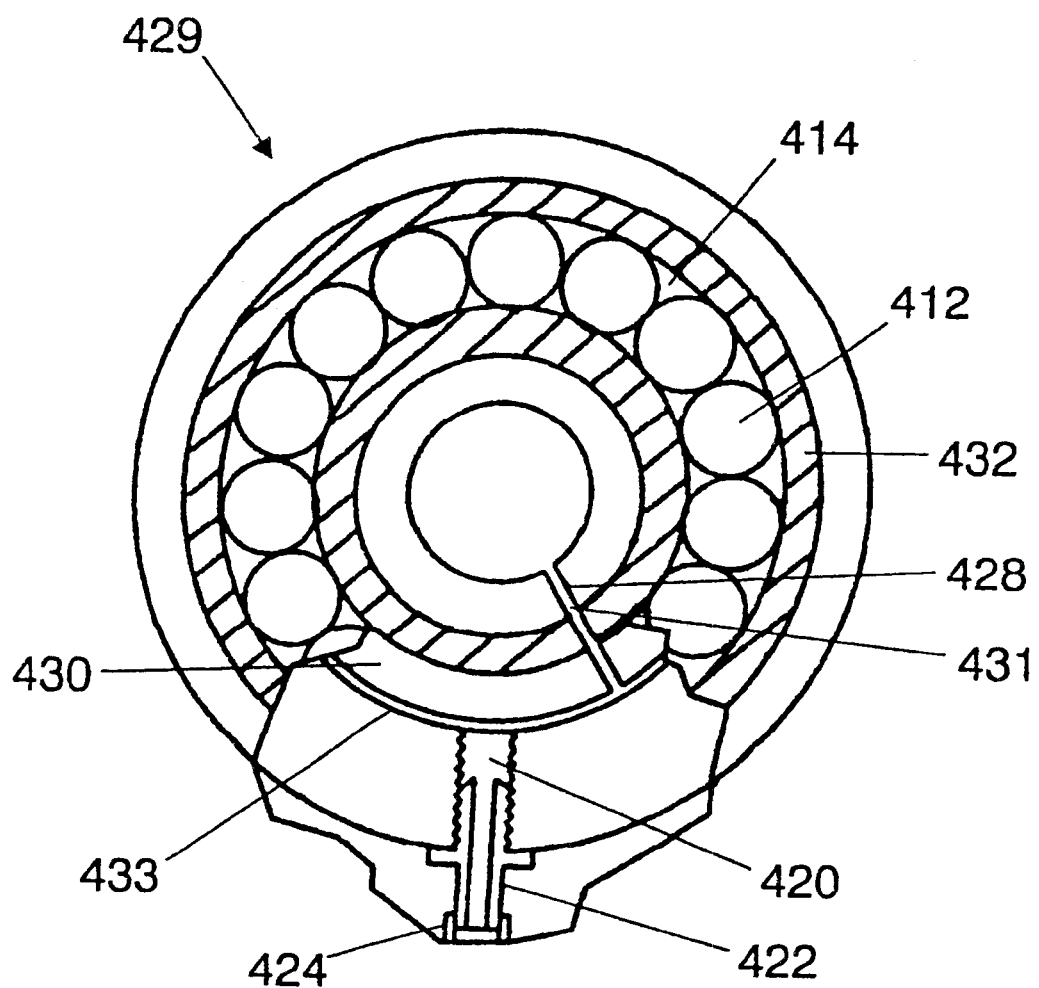
FIG. 33 is a partial sectional view of an alternative embodiment of a portion of the fluid conduit means of the apparatus for cutting and treating vegetation according to the invention illustrated in FIGS. 25–32.

An alternative pulsing sealed hollow shaft fluid delivery apparatus 429, FIG. 33, can also be configured with a hollow rotating shaft 430 which at the center. About shaft 430 is an inside race 431 which are in contact with ball bearings 412 packed in a seal 414 within the press fitted outside race 432. A stationary shaft 433 is in fixed contact with the outside race 432. The stationary shaft 433 is fitted with hollow spokes 420, which are in communication with a fitting 422 having a nipple 424 for engagement with piping or tubing 426. At least one port or slot 428 is tapped into the rotating shaft 430 and allows fluid to flow from the rotating shaft 430 to the hollow spoke 420. During most of the rotation cycle the fluid in the system is static, from the hollow spoke 420 to just before the outlet port spaced from the blade. When slot 428 comes into alignment with hollow spoke 420 additional fluid is pulsed through the system resulting in fluid on the lower cutting edge of the blade. In this embodiment the outside fittings are stationary and this device can be used as a timed distributor for sickle bar cutting systems.

Figure 25:
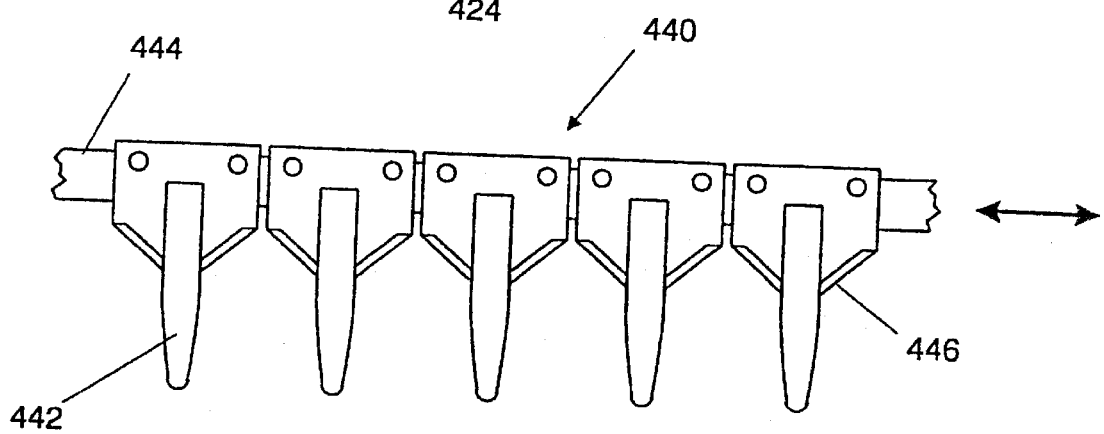
FIG. 25 is a top view of a sickle bar according to the invention.

FIG. 25 is a top view of a sickle bar according to the invention. The sickle bar type mowing apparatus 440, FIG. 25, having guards 442 and a reciprocating bar 444. A series of blades 446 are mounted to the bar 444.

Figure 26:
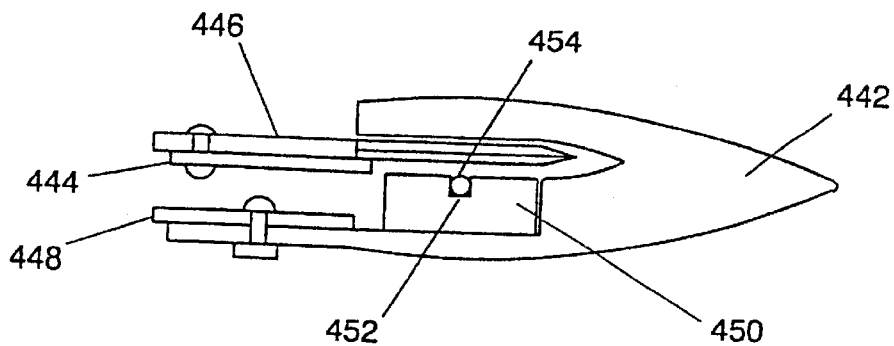
FIG. 26 is an end view of the sickle bar of FIG. 25.

FIG. 26 is an end view of the sickle bar of FIG. 25. The guards 442 being mounted to guard mount bar 448, FIG. 26. Seated in the guards 442 is a sickle bar manifold 450 having a delivery tube 452, which may be welded, which provides fluid delivery through exit ports 454 in tube 452. Fluid from the timed distributor is of a pulsing sealed hollow shaft fluid delivery apparatus 429 is connected for communication through tube 452.

Figure 27:
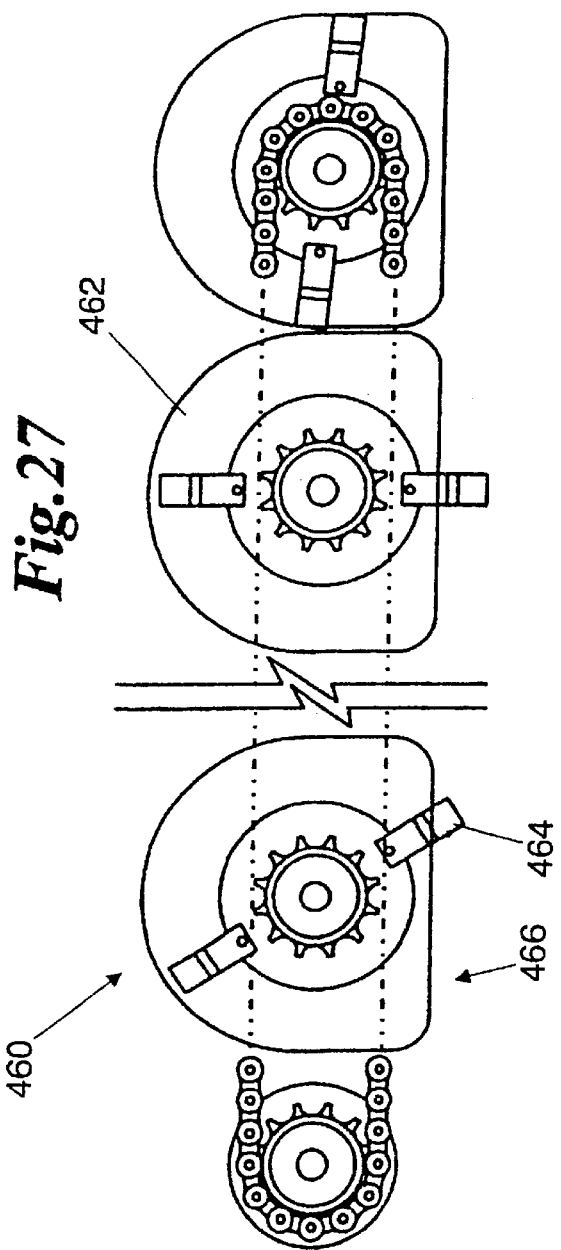
FIG. 27 is a top view of a multiple disk mower according to the invention.

FIG. 27 is a top view of a multiple disk mower according to the invention. A disk type mowing apparatus 460, FIG. 27, uses a series of cutting decks 462. Here, the blades 464 from the disks protrude from the apparatus in the front 466.

Figure 28:
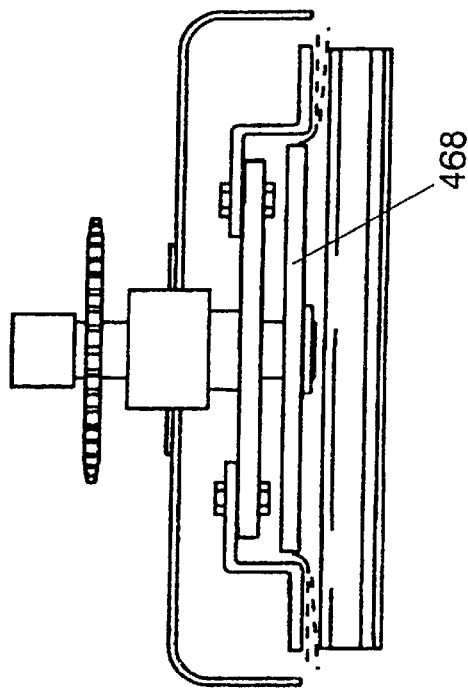
FIG. 28 is a side view of one of the disk of the multiple disk mower of FIG. 27.

FIG. 28 is a side view of one of the disk of the multiple disk mower of FIG. 27. The fluid delivery apparatus can be nearly identical to that of the rotary cutter using an elongated fluid delivery member 468, FIG. 28, to wet out the blades 464 of the disk type mower. Alternatively the disk mower could use the pulsing sealed hollow shaft fluid delivery system 406 to deliver timed pulse of treatment fluid to the blades of disk.

Figure 29:
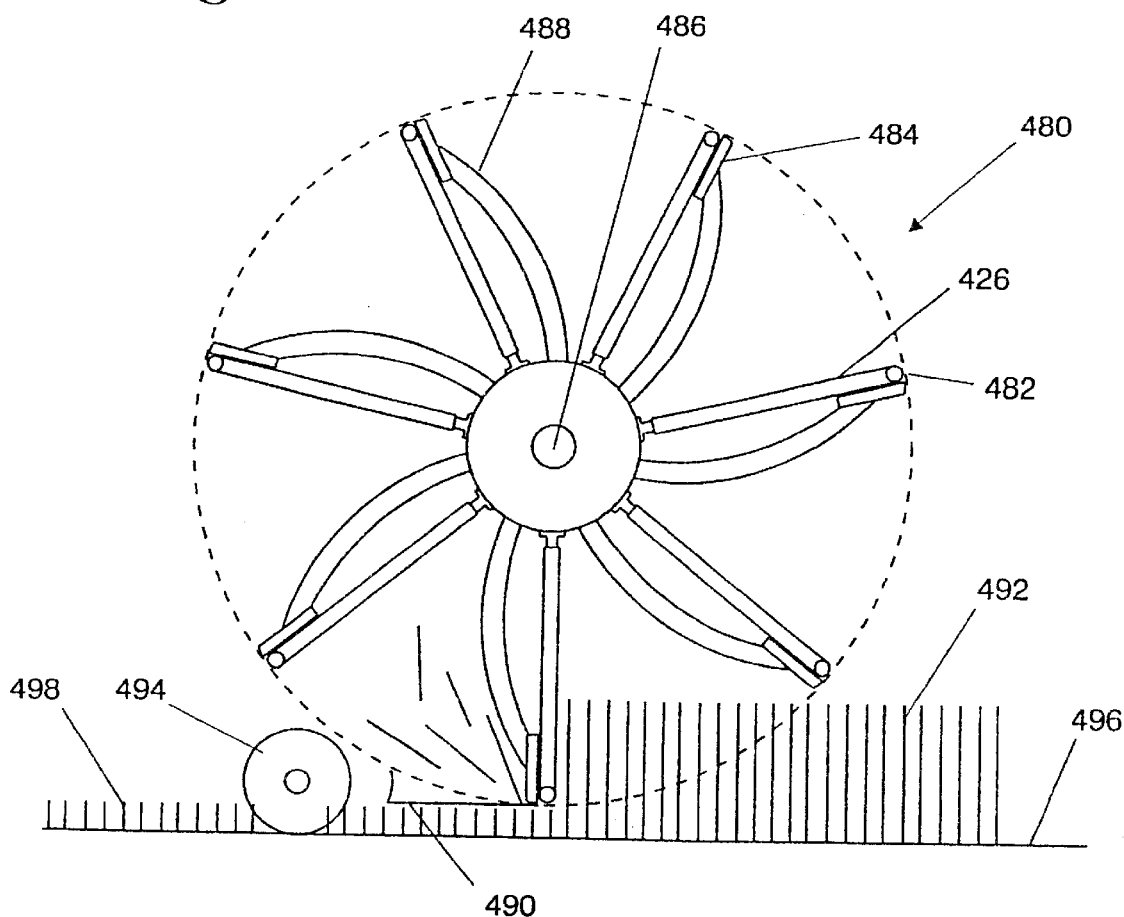
FIG. 29 is a side view of a reel mower according to the invention.

FIG. 29 is a side view of a reel mower according to the invention. A reel type mowing apparatus 480, FIG. 29, which utilizes the sealed hollow shaft fluid delivery apparatus 406, described above, to deliver fluid to the bottom cutting edge 482 of the rotating blades 484. This device uses a central axle 486 configured as fluid delivery apparatus 406. Attached to the axle 486 are blade support spokes 488 as well as tubing 426 which facilitate fluid flow from the axle to the blade. The interactions between the rotating blades 484 and a stationary blade or anvil 490 effect both the cut of the vegetation 492 and the delivery of the treatment fluid directly into the plants vascular stream. A roller 494 facilitates movement over the ground 496 and fresh cut vegetation 498. In this system the pulse of treatment fluid is timed to be released just before the blade comes into cutting contact with the vegetation. As with the rotary mower it can be connected to ground speed regulator which controls the amount of fluid being carried through the system over time.

Figure 30:
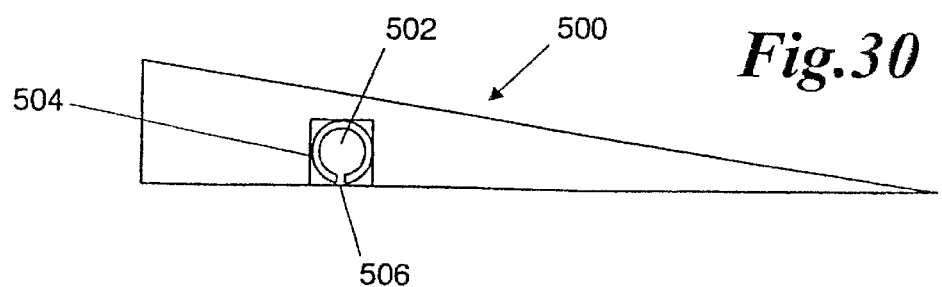
FIG. 30 is an enlarged view of the stationary blade of the reel mower of FIG. 29 showing an alternative embodiment of the treatment fluid exit ports.

FIG. 30 is an alternative enlarged view of the anvil 490 of the reel mower of FIG. 29. This alternative reel type mowing apparatus, which, instead of utilizing the sealed hollow shaft fluid delivery apparatus 406, uses a standard, "non-wetable" reel, with a wetable stationary blade or anvil 500. The stationary blade or anvil 500 has a machined groove 502 in which a fluid delivery tube 504 is welded into place. The fluid delivery tube has a continuous slot exit port 506 or porous metal or plastic tubing. This system is connected to a ground speed regulator for controlled release based on ground speed of the device.

Figure 31:
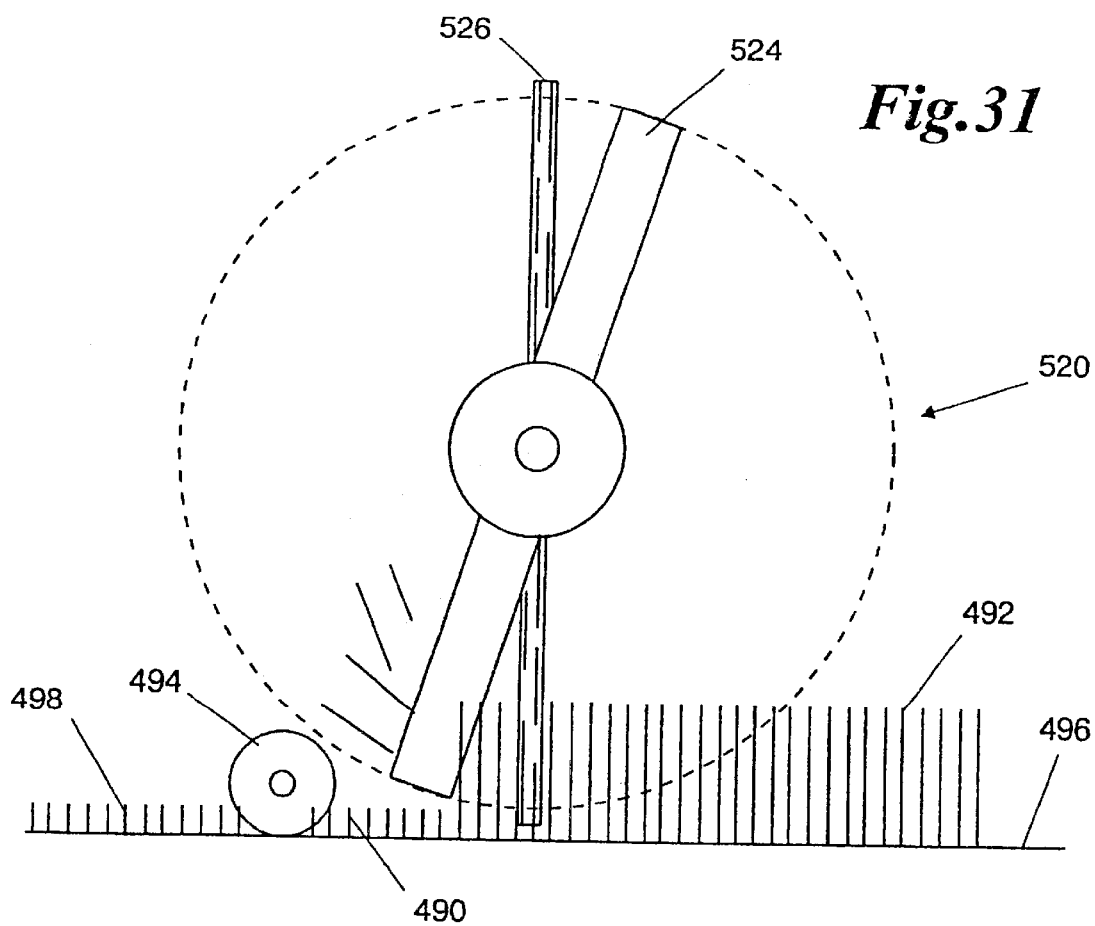
FIG. 31 is a side view of a flail mower according to the invention.

FIG. 31 is a side view of a flail mower according to the invention. The flail type mowing apparatus 520, FIG. 31, which is comprised of a drive shaft 522, FIG. 32, configured as pulsing sealed hollow shaft fluid delivery apparatus 406, fitted with multiple blades 524 and multiple fluid delivery bars 526. Fluids are delivered to each individual fluid delivery bar 526 by the pulsing sealed hollow shaft fluid delivery apparatus 406, FIG. 24, which allows for timed controlled delivery of fluids. In operation fluid is delivered to the cutting edge 528 just prior to the cut to facilitate delivery of fluids directly into the plants vascular system. Note that the blades are staggered to ensure an even cut across the width of the drive shaft 230. This system can be connected to a ground speed regulator for controlled release based on ground speed of the device.

Figure 32:
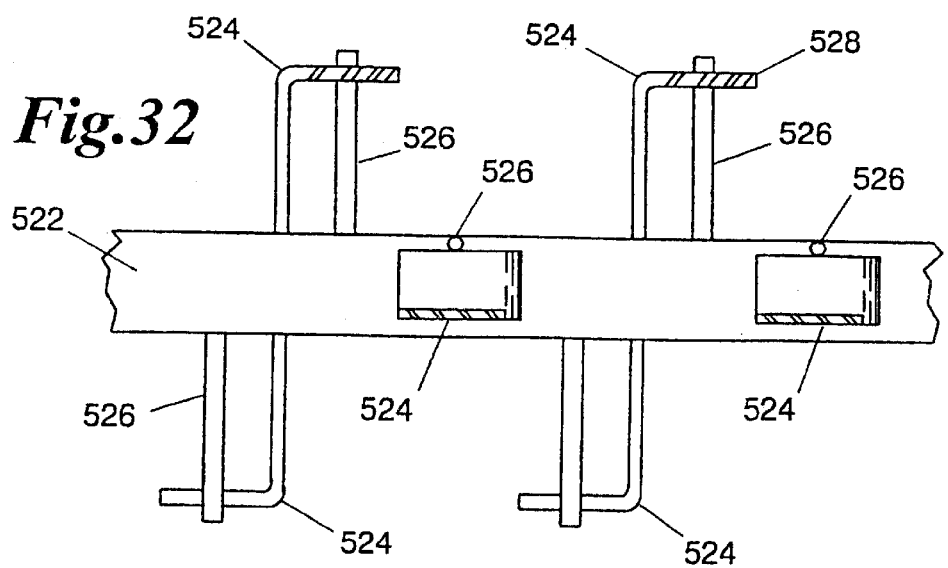
FIG. 32 is a top view of the flail mower of FIG. 31.

FIG. 32 is a top view of the flail mower of FIG. 31 and which helps depict the spacial relationship of the blades 524, fluid delivery bars 526 with the drive shaft 522.

FIG. 33 is a partial sectional view of an alternative embodiment of a portion of the fluid conduit means of the apparatus for cutting and treating vegetation according to the invention illustrated in FIGS. 25–32. In this embodiment the hollow center shaft 430 rotates while the outer stationary shaft 433, hollow spokes 420, fittings 422 and nipple 424 all remain stationary.

It is to be understood that the foregoing description and specific embodiments are merely illustrative of the best mode of the invention and the principles thereof, and that various modifications may be made to the apparatus by those skilled in the art without departing from the spirit and scope of the invention, which is therefore understood to be limited only by the scope of the appended claims.

That which is claimed is:

1. A method of cutting vegetation and treating the cut vegetation with a treatment fluid at the time that the vegetation is cut, said method comprising the steps of:

providing a mower with at least one cutting blade, a fluid container and a fluid conduit extending between the fluid container, and the at least one cutting blade;

cutting the vegetation using the at least one cutting blade; and delivering a metered stream of the treatment fluid to one side of the at least one cutting blade, wherein said metered stream is proportioned by a sensing means to a rate of movement and a position of the mower so that the treatment fluid is continuously available to the cut vegetation at the time that the vegetation is cut.

2. The method of claim 1 further comprising the steps of:

pumping the treatment fluid from the fluid container through the fluid conduit to the at least one cutting blade; and adjusting the sensing means such that the amount of treatment fluid of the metered stream that reflects the width of the cut and a volume to be applied to the cut vegetation at the time that the vegetation is cut.

3. The method of claim 1 further comprising the steps of securing the at least one cutting blade to a rotatable cutting blade drive means; and rotating the at least one cutting blade using the cutting blade drive means.

4. The method of claim 1 wherein the mower with the at least one cutting blade is a bushog mower attached to and pulled behind a tractor.

5. The method of claim 1 wherein the at least one cutting blade is rotatably mounted on a mower head attached to a hinged boom arm, wherein said position of mower is determined by a control unit comprising a global positioning satellite transceiver.

6. The method of claim 1 wherein the vegetation has a translocation stream therein, and the treatment fluid that is continuously available to the cut vegetation at the time that the vegetation is cut is absorbed directly into the translocation stream of the cut vegetation.

7. The method of claim 6 wherein between about 75 percent and about 95 percent of the treatment fluid that is continuously available to the cut vegetation at the time that the vegetation is cut is absorbed directly into the translocation stream of the cut vegetation.

8. The method of claim 7 wherein the treatment fluid that is absorbed directly into the translocation stream of the cut vegetation migrates to the root system of the vegetation.

9. The method of claim 1 wherein the treatment fluid that is delivered to the at least one cutting blade is not broadcast, whereby it does not contaminate the soil surrounding the vegetation and the underground water supply.

10. The method of claim 1 wherein the treatment fluid is delivered to the underside of the at least one cutting blade and is applied directly to the remaining stems of the cut vegetation.

11. The method of claim 1 wherein the treatment fluid is delivered to the underside of the at least one cutting blade.

12. The method of claim 1 further comprising the step of controlling the flow rate of treatment fluid which is continuously available to the cut vegetation at the time that the vegetation is cut to less than about 2.5 gallons per acre.

13. The method of claim 12 wherein the flow rate of treatment fluid which is continuously available to the cut vegetation at the time that the vegetation is from about 1.0 gallons per acre to about 2.5 gallons per acre.

14. A method of cutting vegetation and treating the cut vegetation with a treatment fluid at the time that the vegetation is cut, said method comprising the steps of:

providing a mower with at least one cutting blade, a fluid container and a fluid conduit extending from the fluid container and terminating at an opening through which the treatment fluid can exit and which is spaced from the underside of at least one cutting blade;

cutting the vegetation using the at least one cutting blade; and delivering a metered stream of the treatment fluid through said opening so that the treatment fluid exiting said opening bridges a gap defined between the opening and the at least one cutting blade and contacts the underside of said at least one cutting blade so that the treatment fluid is continuously available to the cut vegetation at the time that the vegetation is cut; wherein said metered stream is controllably indexed to a rate of movement and a position of the mower.

* * * * *